United States Patent
Nogami et al.

(10) Patent No.: US 9,730,194 B2
(45) Date of Patent: Aug. 8, 2017

(54) TERMINAL, BASE STATION, COMMUNICATIONS SYSTEM, AND COMMUNICATION METHOD

(75) Inventors: Toshizo Nogami, Osaka (JP); Shoichi Suzuki, Osaka (JP); Tatsushi Aiba, Osaka (JP); Daiichiro Nakashima, Osaka (JP); Katsunari Uemura, Osaka (JP); Kazuyuki Shimezawa, Osaka (JP); Kimihiko Imamura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 425 days.

(21) Appl. No.: 14/233,934

(22) PCT Filed: Jul. 19, 2012

(86) PCT No.: PCT/JP2012/068338
§ 371 (c)(1),
(2), (4) Date: Jan. 21, 2014

(87) PCT Pub. No.: WO2013/015194
PCT Pub. Date: Jan. 31, 2013

(65) Prior Publication Data
US 2014/0153532 A1    Jun. 5, 2014

(30) Foreign Application Priority Data
Jul. 22, 2011    (JP) .................. 2011-160593

(51) Int. Cl.
*H04W 72/04* (2009.01)
*H04L 1/18* (2006.01)
(Continued)

(52) U.S. Cl.
CPC ....... *H04W 72/0406* (2013.01); *H04L 1/1861* (2013.01); *H04W 72/042* (2013.01);
(Continued)

(58) Field of Classification Search
None
See application file for complete search history.

(56) References Cited

U.S. PATENT DOCUMENTS

2010/0275083 A1* 10/2010 Nam ................. H03M 13/6306
714/748
2011/0205981 A1* 8/2011 Koo ..................... H04L 1/1671
370/329
(Continued)

FOREIGN PATENT DOCUMENTS

CA    2 768 951 A1    2/2011
EP    2 302 830 A2    3/2011
(Continued)

OTHER PUBLICATIONS

Official Communication issued in International Patent Application No. PCT/JP2012/068338, mailed on Sep. 4, 2012.
(Continued)

*Primary Examiner* — Jenee Williams
(74) *Attorney, Agent, or Firm* — Keating & Bennett, LLP

(57) ABSTRACT

A terminal that communicates with a base station monitors a physical downlink control channel allocated in a physical downlink control channel region and an enhanced physical downlink control channel allocated in a physical downlink shared channel region different from the physical downlink control channel region. If the physical downlink control channel is detected, the terminal reports response information via a physical uplink control channel resource corresponding to the resource in which the physical downlink control channel was detected. If the enhanced physical downlink control channel is detected, the terminal reports via a prescribed physical uplink control channel resource.

8 Claims, 20 Drawing Sheets

(51) Int. Cl.
*H04J 13/00* (2011.01)
*H04J 13/18* (2011.01)
*H04J 13/22* (2011.01)
*H04W 28/06* (2009.01)
*H04W 72/00* (2009.01)
*H04W 88/02* (2009.01)
*H04W 88/08* (2009.01)

(52) U.S. Cl.
CPC ......... *H04J 13/004* (2013.01); *H04J 13/0059* (2013.01); *H04J 13/0074* (2013.01); *H04J 13/18* (2013.01); *H04J 13/22* (2013.01); *H04L 1/1819* (2013.01); *H04W 28/06* (2013.01); *H04W 72/00* (2013.01); *H04W 88/02* (2013.01); *H04W 88/08* (2013.01)

(56) References Cited

U.S. PATENT DOCUMENTS

| | | | | |
|---|---|---|---|---|
| 2011/0243066 | A1* | 10/2011 | Nayeb Nazar | H04L 1/007 370/328 |
| 2011/0305213 | A1* | 12/2011 | Lohr | H04L 1/1887 370/329 |
| 2012/0002593 | A1* | 1/2012 | Kim | H04L 1/1854 370/315 |
| 2012/0099491 | A1* | 4/2012 | Lee | H04L 1/0015 370/280 |
| 2012/0106465 | A1* | 5/2012 | Haghighat | H04W 72/1289 370/329 |
| 2012/0113831 | A1* | 5/2012 | Pelletier | H04L 5/0058 370/252 |
| 2012/0320846 | A1* | 12/2012 | Papasakellariou | H04W 72/042 370/329 |
| 2012/0320847 | A1* | 12/2012 | Nam | H04W 72/0406 370/329 |
| 2013/0003604 | A1* | 1/2013 | Blankenship | H04L 5/0053 370/255 |
| 2013/0039284 | A1* | 2/2013 | Marinier | H04L 5/001 370/329 |
| 2013/0128857 | A1 | 5/2013 | Nakao | |
| 2014/0086189 | A1 | 3/2014 | Takeda et al. | |

FOREIGN PATENT DOCUMENTS

| | | |
|---|---|---|
| JP | 2012-235353 A | 11/2012 |
| WO | 2012/029246 A1 | 3/2012 |
| WO | 2012/150666 A1 | 11/2012 |

OTHER PUBLICATIONS

3GPP TS 36.211 V10.2.0, "3rd Generation Partnership Project; Technical Specification Group Radio Access Network; Evolved Universal Terrestrial Radio Access (E-UTRA); Physical Channels and Modulation (Release 10)", Jun. 2011; 103 pages.

3GPP TS 36.213 V10.2.0, "3rd Generation Partnership Project; Technical Specification Group Radio Access Network; Evolved Universal Terrestrial Radio Access (E-UTRA); Physical layer procedures (Release 10)", Jun. 2011; 120 pages.

Nogami, T. et al.; "Terminal, Base Station, Communcations Systems, and Communication Method;"; U.S. Appl. No. 14/233,928, filed Jan. 21, 2014.

* cited by examiner

FIG. 7

UPLINK CONTROL CHANNEL LOGICAL RESOURCES

| $n_{PUCCH}$ | ORTHOGONAL CODE | CYCLIC SHIFT | m |
|---|---|---|---|
| 0 | OC0 | CS0 | $N_{F2}$ |
| 1 | OC1 | CS0 | $N_{F2}$ |
| 2 | OC2 | CS0 | $N_{F2}$ |
| 3 | OC0 | CS2 | $N_{F2}$ |
| 4 | OC1 | CS2 | $N_{F2}$ |
| 5 | OC2 | CS2 | $N_{F2}$ |
| ⋮ | ⋮ | ⋮ | ⋮ |
| 15 | OC0 | CS10 | $N_{F2}$ |
| 16 | OC1 | CS10 | $N_{F2}$ |
| 17 | OC2 | CS10 | $N_{F2}$ |
| 18 | OC0 | CS0 | $N_{F2}+1$ |
| 19 | OC1 | CS0 | $N_{F2}+1$ |
| 20 | OC2 | CS0 | $N_{F2}+1$ |
| ⋮ | ⋮ | ⋮ | ⋮ |

DOWNLINK CONTROL CHANNEL RESOURCES

DOWNLINK CONTROL CHANNEL RESOURCES

FIG. 16

| DOWNLINK GRANT | PUCCH RESOURCE |
|---|---|
| PDCCH | PUCCH RESOURCE CORRESPONDING TO SMALLEST CCE INDEX OF PDCCH |
| E-PDCCH | PUCCH RESOURCE SPECIFIED VIA RRC |

FIG. 17

| DOWNLINK GRANT | PUCCH RESOURCE |
|---|---|
| PDCCH | PUCCH RESOURCE CORRESPONDING TO SMALLEST CCE INDEX OF PDCCH |
| E-PDCCH (CROSS-INTERLEAVED) | PUCCH RESOURCE CORRESPONDING TO SMALLEST CCE INDEX OF E-PDCCH |
| E-PDCCH (NOT CROSS-INTERLEAVED) | PUCCH RESOURCE SPECIFIED VIA RRC |

| INDEX | BIT SEQUENCE | $n^1_{PUCCH,RRC}$ |
|---|---|---|
| 0 | 00 | A |
| 1 | 01 | B |
| 2 | 10 | C |
| 3 | 11 | D |

| INDEX | $\mathrm{mod}(n^{1st}_{VRB},4)$ | $n_{PUCCH}$ |
|---|---|---|
| 0 | 0 | A |
| 1 | 1 | B |
| 2 | 2 | C |
| 3 | 3 | D |

TERMINAL, BASE STATION, COMMUNICATIONS SYSTEM, AND COMMUNICATION METHOD

TECHNICAL FIELD

The present invention relates to a terminal, base station, communications system, and communication method.

BACKGROUND ART

In wireless communications systems such as Long Term Evolution (LTE) and LTE-Advanced (LTE-A) defined by Third Generation Partnership Project (3GPP), wireless LAN defined by The Institute of Electrical and Electronics engineers (IEEE), and Worldwide Interoperability for Microwave Access (WiMAX), a base station (a base station device, downlink transmitting device, uplink receiving device, eNodeB) and a terminal (terminal device, mobile station device, downlink receiving device, uplink transmitting device, UE) include multiple transmit/receive antennas and use multi-input multi-output (MIMO) technology to spatially multiplex data signals and achieve high-speed data communications. In LTE and LTE-A in particular, the orthogonal frequency division multiplexing (OFDM) scheme is employed in the downlink to achieve high spectral efficiency and the single carrier-frequency division multiple access (SC-FDMA) scheme is used in the uplink to reduce peak power. Furthermore, hybrid ARQ (HARQ), which combines automatic repeat request (ARQ) with error correction codes, has been adopted.

FIG. 23 shows a configuration of an LTE communications system implementing HARQ. In FIG. 23, a base station 2301 notifies a terminal 2302 of control information associated with downlink transmit data 2304 over a physical downlink control channel (PDCCH) 2303. The terminal 2302 first performs detection of control information. If control information is detected, the terminal 2302 uses it to extract downlink transmit data 2504. After detecting the control information, the terminal 2302 reports HARQ response information indicating whether the downlink transmit data 2304 has been successfully extracted or not to the base station 2301 over a physical uplink control channel (PUCCH) 2305. Here, a resource for the PUCCH 2305 (PUCCH resource) available for the terminal 2302 is implicitly/tacitly and uniquely determined by the resource for the PDCCH 2303 to which the control information is assigned. The terminal 2302 thus can use a dynamically assigned PUCCH resource when reporting HARQ response information. It is also possible to prevent overlap of PUCCH resources among terminals (see Non Patent Literatures 1 and 2).

CITATION LIST

Non Patent Literature

NPL 1: 3rd Generation Partnership Project; Technical Specification Group Radio Access Network; Evolved Universal Terrestrial Radio Access (E-UTRA); Physical Channels and Modulation (Release 10), June 2011, 3GPP TS 36.211 V10.2.0 (2011-06)

NPL 2: 3rd Generation Partnership Project; Technical Specification Group Radio Access Network; Evolved Universal Terrestrial Radio Access (E-UTRA); Physical layer procedures (Release 10), June 2011, 3GPP TS 36.213 V10.2.0 (2011-06)

SUMMARY OF INVENTION

Technical Problem

In order to increase the number of terminals that can be covered by a base station in a wireless communications system capable of HARQ, enhanced physical downlink control channel can be used in addition to physical downlink control channel. With the conventional scheme for specifying physical uplink control channel resources, physical uplink control channel resources cannot be specified between the base station and the terminal when a base station transmits control information over an enhanced physical downlink control channel, which hampers improvement in transmission efficiency.

The present invention has been made in view of the problem, and an object thereof is to provide a base station, terminal, communications system, and communication method for, in a wireless communications system in which a base station and a terminal communicates with each other, allowing physical uplink control channel resources to be efficiently specified even in a case where the base station notifies the terminal of control information not only over a physical downlink control channel but an enhanced physical downlink control channel.

Solution to Problem (1) According to an aspect of the invention, there is provided a terminal that communicates with a base station, the terminal including: a downlink control channel detecting unit that monitors a physical downlink control channel allocated in a physical downlink control channel region and an enhanced physical downlink control channel allocated in a physical downlink shared channel region different from the physical downlink control channel region; a data extracting unit that, if the downlink control channel detecting unit has detected the physical downlink control channel or the enhanced physical downlink control channel, extracts transmit data on a physical downlink shared channel associated with the detected physical downlink control channel or enhanced physical downlink control channel; a response information generating unit that generates response information for the extracted transmit data; an uplink control channel generating unit that, if the downlink control channel detecting unit has detected the physical downlink control channel, generates a physical uplink control channel by mapping the response information to a physical uplink control channel resource corresponding to the physical downlink control channel resource in which the physical downlink control channel was detected, and if the downlink control channel detecting unit has detected the enhanced physical downlink control channel, generates a physical uplink control channel by mapping the response information to a prescribed physical uplink control channel resource; and a response transmitting unit that transmits a signal including the physical uplink control channel.

(2) The terminal according to an aspect of the invention further includes a higher layer control information acquiring unit that acquires control information including a parameter indicating the prescribed physical uplink control channel resource.

(3) According to an aspect of the invention, there is provided a terminal that communicates with a base station, the terminal including: a downlink control channel detecting unit that monitors a physical downlink control channel allocated in a physical downlink control channel region and an enhanced physical downlink control channel allocated in a physical downlink shared channel region different from the physical downlink control channel region; a data extracting unit that, if the downlink control channel detecting unit has detected the enhanced physical downlink control channel, extracts transmit data on a physical downlink shared channel associated with the detected enhanced physical downlink control channel; a response information generating unit that generates response information for the extracted transmit data; an uplink control channel generating unit that generates a physical uplink control channel by mapping the response information to a physical uplink control channel resource specified in the enhanced physical downlink control channel among a plurality of prescribed physical uplink control channel resources; and a response transmitting unit that transmits a signal including the physical uplink control channel.

(4) The terminal according to an aspect of the invention further includes a higher layer control information acquiring unit that acquires control information including parameters indicating the plurality of prescribed physical uplink control channel resources.

(5) The downlink control channel detecting unit included in the terminal according to an aspect of the invention detects an enhanced physical downlink control channel that explicitly specifies one of the plurality of prescribed physical uplink control channel resources.

(6) The downlink control channel detecting unit included in the terminal according to an aspect of the invention detects an enhanced physical downlink control channel that implicitly or tacitly specifies one of the plurality of prescribed physical uplink control channel resources.

(7) According to an aspect of the invention, there is provided a base station that communicates with a terminal, the base station including: a physical control information notification unit that notifies the terminal of a physical downlink control channel allocated in a physical downlink control channel region or an enhanced physical downlink control channel allocated in a physical downlink shared channel region different from the physical downlink control channel region; and a response information receiving unit that, if the physical control information notification unit notified the physical downlink control channel, extracts a physical uplink control channel to which response information for transmit data on a physical downlink shared channel associated with the physical downlink control channel is mapped, from a physical uplink control channel resource corresponding to the physical downlink control channel resource in which the physical downlink control channel was allocated, and if the physical control information notification unit notified the enhanced physical downlink control channel, extracts a physical uplink control channel to which response information for transmit data on the physical downlink shared channel associated with the enhanced physical downlink control channel is mapped, from a prescribed physical uplink control channel resource.

(8) The base station according to an aspect of the invention further includes a higher layer control information notification unit that notifies the terminal of control information including a parameter indicating the prescribed physical uplink control channel resource.

(9) According to an aspect of the invention, there is provided a base station that communicates with a terminal, the base station including: a physical control information notification unit that notifies the terminal of an enhanced physical downlink control channel which is allocated in a physical downlink shared channel region and which specifies one of a plurality of prescribed physical uplink control channel resources; and a response information receiving unit that extracts a physical uplink control channel to which response information for transmit data on the physical downlink shared channel associated with the enhanced physical downlink control channel is mapped, from the physical uplink control channel resource specified by the enhanced physical downlink control channel.

(10) The base station according to an aspect of the invention further includes a higher layer control information notification unit that notifies the terminal of control information including parameters indicating the plurality of prescribed physical uplink control channel resources.

(11) The enhanced physical downlink control channel included in the base station according to an aspect of the invention explicitly specifies one of a plurality of prescribed physical uplink control channel resources.

(12) The enhanced physical downlink control channel included in the base station according to an aspect of the invention implicitly or tacitly specifies one of a plurality of prescribed physical uplink control channel resources.

(13) According to an aspect of the invention, there is provided a communications system in which communication is performed between a base station and a terminal, wherein the base station comprises a physical control information notification unit that notifies the terminal of a physical downlink control channel allocated in a physical downlink control channel region or an enhanced physical downlink control channel allocated in a physical downlink shared channel region different from the physical downlink control channel region; and a response information receiving unit that, if the physical control information notification unit notified the physical downlink control channel, extracts a physical uplink control channel to which response information for transmit data on a physical downlink shared channel associated with the physical downlink control channel is mapped, from a physical uplink control channel resource corresponding to the physical downlink control channel resource in which the physical downlink control channel was allocated, and if the physical control information notification unit notified the enhanced physical downlink control channel, extracts a physical uplink control channel to which response information for transmit data on the physical downlink shared channel associated with the enhanced physical downlink control channel is mapped, from a prescribed physical uplink control channel resource. The terminal comprises: a downlink control channel detecting unit that monitors the physical downlink control channel and the enhanced physical downlink control channel; a data extracting unit that, if the downlink control channel detecting unit has detected the physical downlink control channel or the enhanced physical downlink control channel, extracts transmit data on a physical downlink shared channel associated with the detected physical downlink control channel or enhanced physical downlink control channel; a response information generating unit that generates response information for the extracted transmit data; an uplink control channel generating unit that, if the downlink control channel detecting unit has detected the physical downlink control channel, generates a physical uplink control channel by mapping the response information to a physical uplink control channel resource corresponding to the physical downlink control channel resource in which the physical downlink control channel was detected, and if the downlink control channel detecting unit has detected the enhanced physical downlink control channel, generates a physical uplink control channel by mapping the response information to a prescribed physical uplink control channel resource; and a response transmitting unit that transmits a signal including the physical uplink control channel.

(14) According to an aspect of the invention, there is provided a communication method for a terminal that communicates with a base station, the method including: a step of monitoring a physical downlink control channel allocated in a physical downlink control channel region and an enhanced physical downlink control channel allocated in a physical downlink shared channel region different from the physical downlink control channel region; a step of, if the physical downlink control channel or the enhanced physical downlink control channel has been detected, extracting transmit data on a physical downlink shared channel associated with the detected physical downlink control channel or enhanced physical downlink control channel; a step of generating response information for the extracted transmit data; a step of, if the physical downlink control channel has been detected, generating a physical uplink control channel by mapping the response information to a physical uplink control channel resource corresponding to the physical downlink control channel resource in which the physical downlink control channel was detected, and if the enhanced physical downlink control channel has been detected, generating a physical uplink control channel by mapping the response information to a prescribed physical uplink control channel resource; and a step of transmitting a signal including the physical uplink control channel.

(15) According to an aspect of the invention, there is provided a communication method for a base station that communicates with a terminal, the method including: a step of notifying the terminal of a physical downlink control channel allocated in a physical downlink control channel region or an enhanced physical downlink control channel allocated in a physical downlink shared channel region different from the physical downlink control channel region; and a step of, if the physical downlink control channel was notified, extracting a physical uplink control channel to which response information for transmit data on a physical downlink shared channel associated with the physical downlink control channel is mapped, from a physical uplink control channel resource corresponding to the physical downlink control channel resource in which the physical downlink control channel was allocated, and if the enhanced physical downlink control channel was notified, extracting a physical uplink control channel to which response information for transmit data on the physical downlink shared channel associated with the enhanced physical downlink control channel is mapped, from a prescribed physical uplink control channel resource.

Advantageous Effects of Invention

According to the present invention, in a wireless communications system in which a base station and a terminal communicate with each other, physical uplink control channel resources can be efficiently specified even in a case where the base station notifies the terminal of control information not only over a physical downlink control channel but an enhanced physical downlink control channel.

BRIEF DESCRIPTION OF DRAWINGS

FIG. 7 is a correspondence table showing uplink control channel logical resources in the first embodiment.

FIG. 16 is a table showing correspondence between channels used for transmitting a downlink grant and PUCCH resources in the first embodiment.

FIG. 17 is a table showing correspondence between channels used for transmitting a downlink grant and PUCCH resources in the first embodiment.

DESCRIPTION OF EMBODIMENTS

First Embodiment

A first embodiment of the present invention is described below. A communications system according to the first embodiment includes a base station (base station device, downlink transmitting device, uplink receiving device, eNodeB) and a terminal (terminal device, mobile station device, downlink receiving device, uplink transmitting device, UE).

Figure 1:
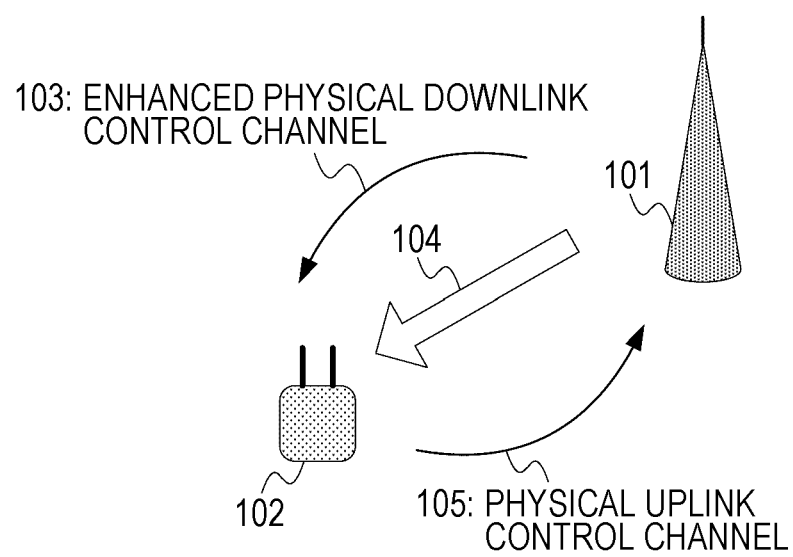
FIG. 1 shows an exemplary configuration of a communications system according to a first embodiment of the present invention.

FIG. 1 shows an exemplary configuration of the communications system according to the first embodiment. In FIG. 1, a base station 101 notifies a terminal 102 of control information associated with downlink transmit data 104 over a PDCCH and/or an enhanced physical downlink control channel (E-PDCCH). The terminal 102 first performs detection of control information. If control information is detected, the terminal 102 uses it to extract downlink transmit data 104. After detecting the control information, the terminal 102 reports HARQ response information (also referred to as "Ack/Nack") indicating whether the downlink transmit data 104 has been successfully extracted or not to the base station 101 over a PUCCH. If the terminal 102 detects control information on the PDCCH, a resource for the physical uplink control channel (PUCCH) 105 available for the terminal 102 is implicitly/tacitly and uniquely determined from the resource for the PDCCH in which the control information was assigned. If the terminal 102 detects the control information on an E-PDCCH 103, a resource for the PDCCH 105 available for the terminal 102 has been specified by the base station 101 in advance.

Figure 2:
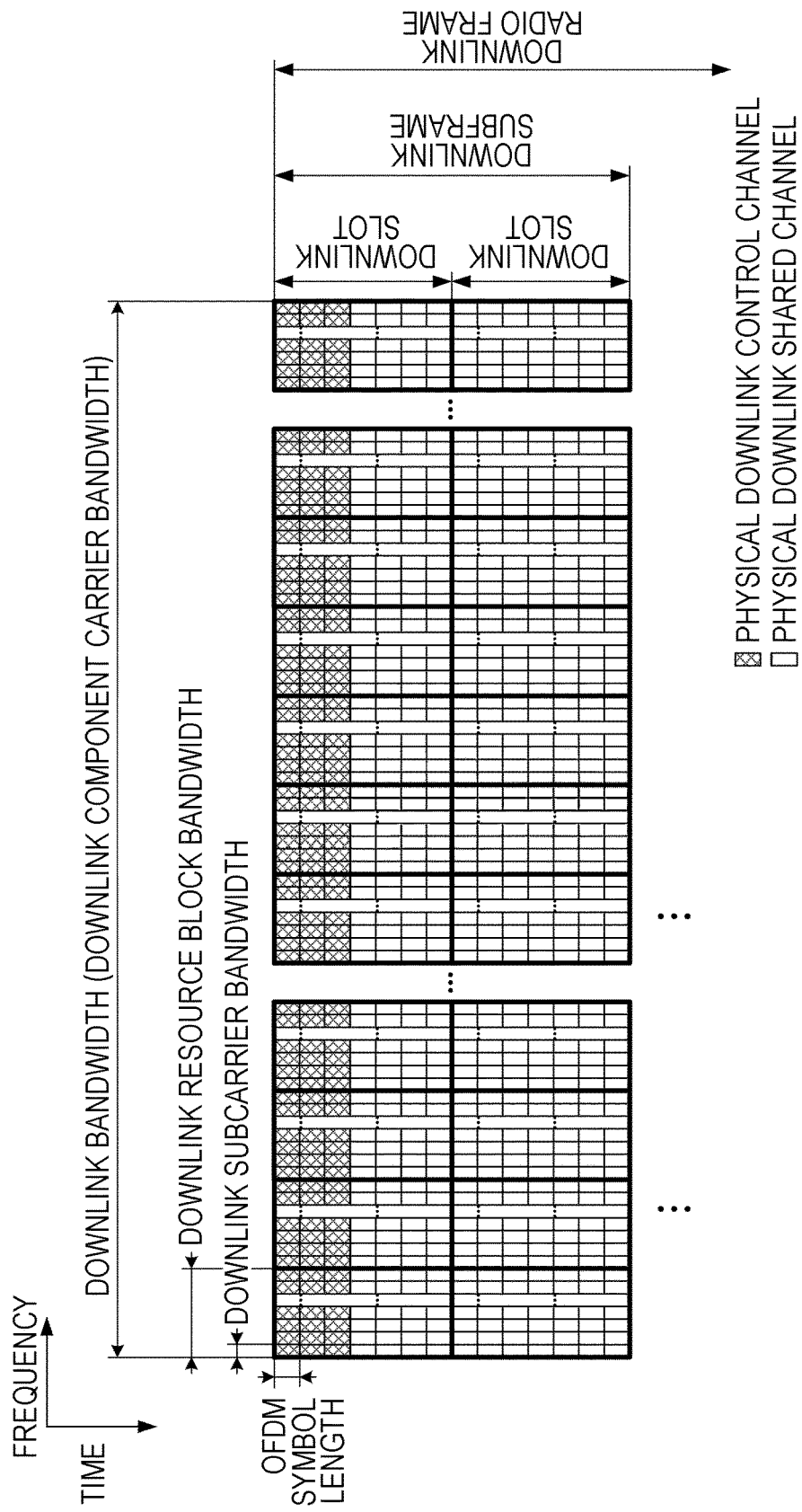
FIG. 2 shows an exemplary structure of a radio frame for the downlink according to the first embodiment.

FIG. 2 shows an exemplary structure of a radio frame for the downlink according to this embodiment. In the downlink, the OFDM access scheme is employed. In the downlink, PDCCH, physical downlink shared channel (PDSCH), and so forth are assigned. A downlink radio frame consists of a pair of downlink resource blocks (RBs). The downlink RB pair is a unit used such as for assigning downlink radio resources, consisting of a frequency band of a predetermined width (RB bandwidth) and a time slot (two slots=one subframe). A downlink RB pair consists of two downlink RBs that are continuous in time domain (RB bandwidth× slots). A downlink RB consists of twelve sub-carriers in frequency domain and seven OFDM symbols in time domain. A region that is defined by one sub-carrier in frequency domain and one OFDM symbol in time domain is called a resource element (RE). A physical downlink control channel is a physical channel on which downlink control information such as terminal device identifier, scheduling information for a physical downlink shared channel, scheduling information for a physical uplink shared channel, modulation scheme, coding rate, and retransmission parameters are transmitted. While downlink subframes in one component carrier (CC) are discussed herein, downlink subframes are defined for each CC and downlink subframes are substantially in synchronization with each other among CCs.

Figure 3:
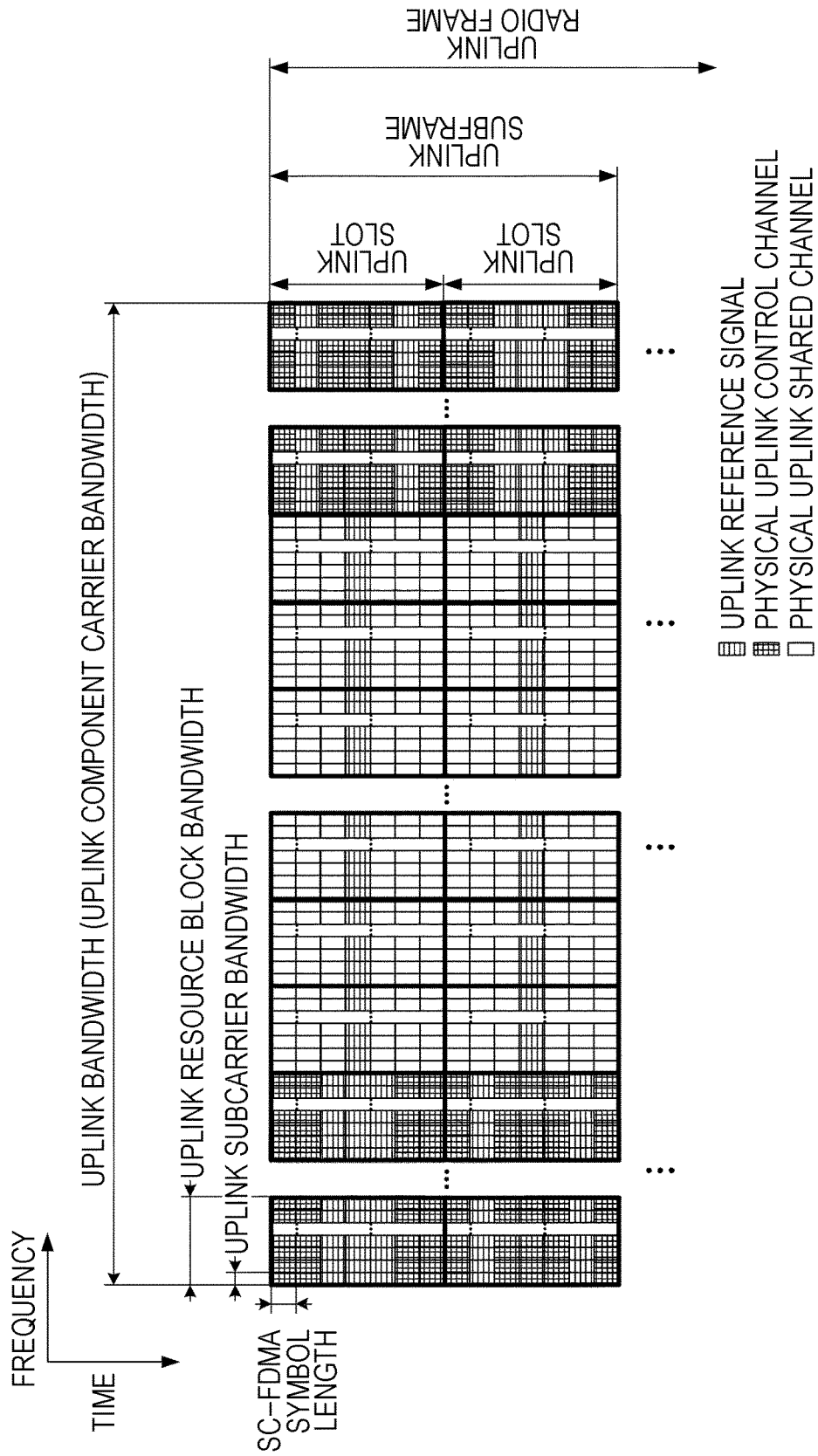
FIG. 3 shows an exemplary structure of a radio frame for the uplink according to the first embodiment.

FIG. 3 shows an exemplary structure of an uplink radio frame according to this embodiment. In the uplink, the SC-FDMA scheme is employed. In the uplink, physical uplink shared channel (PUSCH), PUCCH, and the like are assigned. An uplink reference signal is assigned to part of the PUCCH and/or the PUCCH. An uplink radio frame consists of an uplink RB pair. The uplink RB pair is the unit used such as for assigning uplink radio resources and the like, consisting of a frequency band of a predetermined width (RB bandwidth) and a time slot (two slots=one subframe). An uplink RB pair consists of two uplink RBs that are continuous in time domain (RB bandwidth×slots). An uplink RB consists of twelve sub-carriers in frequency domain and seven SC-FDMA symbols in time domain. While uplink subframes in one CC are discussed herein, uplink subframes are defined for each CC.

Figure 4:
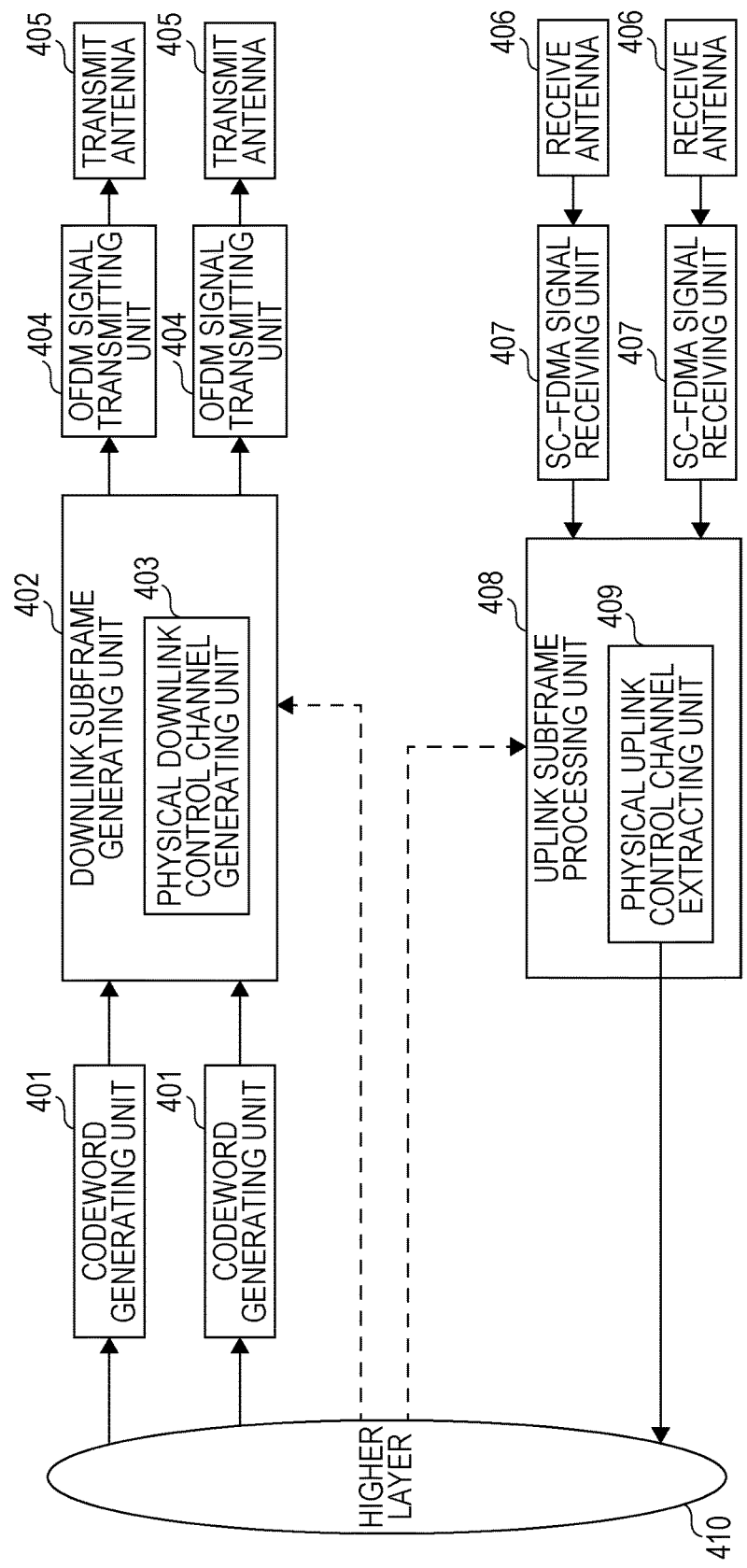
FIG. 4 is a schematic block diagram showing an exemplary configuration of a base station according to the first embodiment.

FIG. 4 is a schematic block diagram showing an exemplary configuration of the base station 101 in this embodiment. The base station 101 includes a codeword generating unit 401, a downlink subframe generating unit 402, an OFDM signal transmitting unit (physical control information notification unit) 404, a transmit antenna (base station transmit antenna) 405, a receive antenna (base station receive antenna) 406, an SC-FDMA signal receiving unit (response information receiving unit) 407, an uplink subframe processing unit 408, and a higher layer (higher layer control information notification unit) 410. The downlink subframe generating unit 402 has a physical downlink control channel generating unit 403. The uplink subframe processing unit 408 has a physical uplink control channel extracting unit 409.

Figure 5:
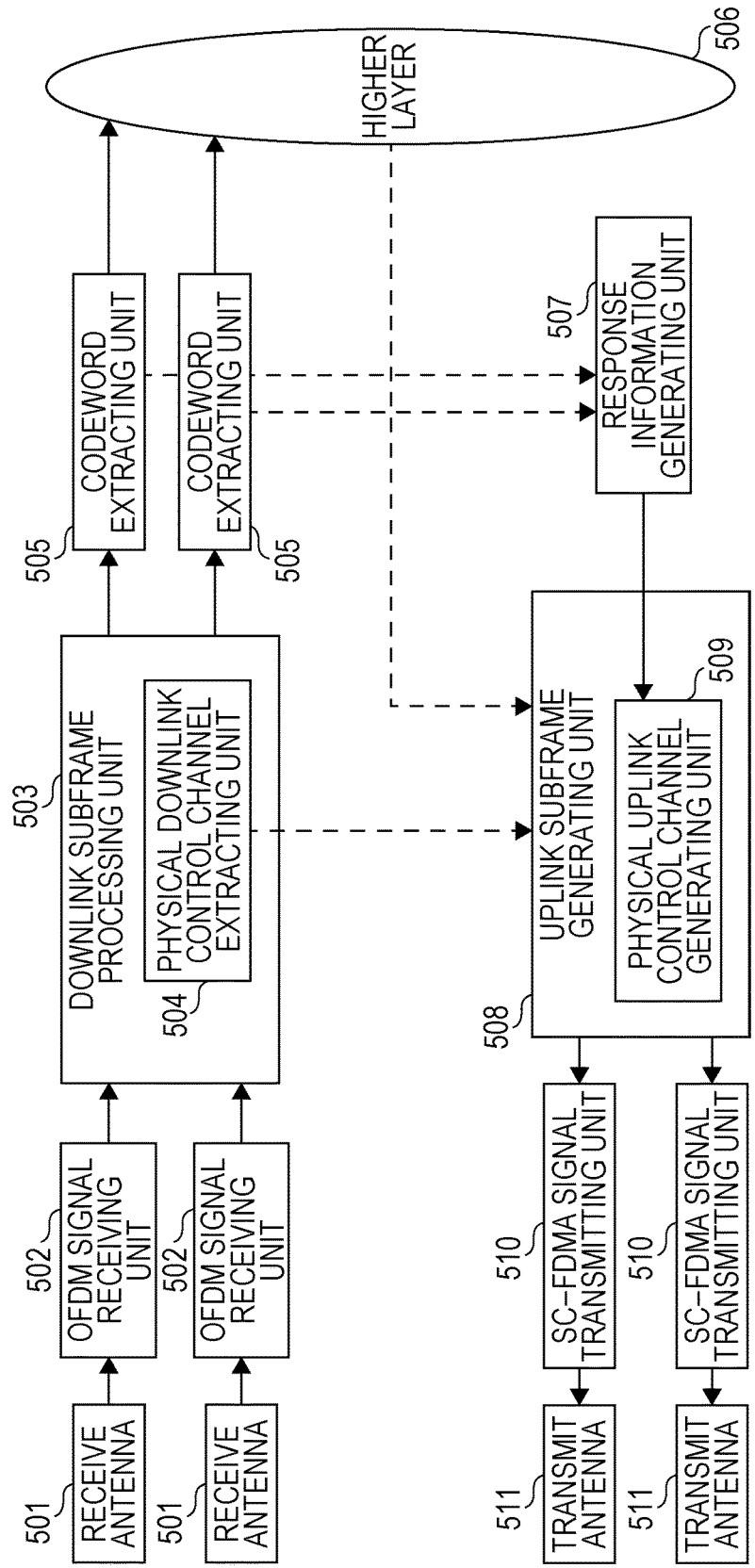
FIG. 5 is a schematic block diagram showing an exemplary configuration of a terminal according to the first embodiment.

FIG. 5 is a schematic block diagram showing an exemplary configuration of the terminal 102 in this embodiment. The terminal 102 includes a receive antenna (terminal receive antenna) 501, an OFDM signal receiving unit (downlink receiving unit) 502, a downlink subframe processing unit 503, a codeword extracting unit (data extracting unit) 505, a higher layer (higher layer control information acquiring unit) 506, a response information generating unit 507, an uplink subframe generating unit 508, an SC-FDMA signal transmitting unit (response transmitting unit) 510, and a transmit antenna (terminal transmit antenna) 511. The downlink subframe processing unit 503 has a physical downlink control channel extracting unit (downlink control channel detecting unit) 504. The uplink subframe generating unit 508 has a physical uplink control channel generating unit (uplink control channel generating unit) 509.

First, using FIGS. 4 and 5, the flow of downlink data transmission and reception is described. At the base station 101, transmit data (also called transport blocks) sent from the higher layer 410 goes through processes such as error correction coding and rate matching in the codeword generating unit 401, and a codeword is generated. A maximum of two codewords are transmitted simultaneously in a subframe within a cell. The downlink subframe generating unit 402 generates downlink subframes according to instructions from the higher layer 410. The codeword generated by the codeword generating unit 401 is first converted to a modulation symbol sequence through a modulation process such as phase shift keying (PSK) modulation and quadrature amplitude modulation (QAM) modulation. The modulation symbol sequence is also mapped to REs of some RBs and downlink subframes for each antenna port are generated through precoding. Downlink REs are defined so as to respectively correspond to sub-carriers in OFDM symbols. The transmit data sequence sent from the higher layer 410 here contains control information (higher layer control information) for radio resource control (RRC) signaling. The physical downlink control channel generating unit 403 generates a physical downlink control channel. The control information contained in the physical downlink control channel (downlink control information, downlink grants) includes information such as modulation and coding scheme (MCS) indicating the modulation scheme used in downlink and the like, downlink resources assignment indicating RBs used for data transmission, HARQ control information used for HARQ control (redundancy version, HARQ process number, new data indicator), and PUCCH-TPC (transmission power control) commands used for closed loop controlling transmission power on the PUCCH. The downlink subframe generating unit 402 maps the physical downlink control channel to REs in downlink subframes according to instructions from the higher layer 410. The downlink subframes for each antenna port generated by the downlink subframe generating unit 402 are modulated into an OFDM signal at the OFDM signal transmitting unit 404 and sent via the transmit antenna 405.

At the terminal 102, the OFDM signal is received by the OFDM signal receiving unit 502 via the receive antenna 501 and OFDM demodulation is performed. The downlink subframe processing unit 503 first detects a PDCCH (a first downlink control channel) or an E-PDCCH (a second downlink control channel) at the physical downlink control channel extracting unit 504. More specifically, the physical downlink control channel extracting unit 504 decodes it in a region in which a PDCCH can be placed (a first downlink control channel region) or in a region in which an E-PDCCH can be placed (a second downlink control channel region, a potential E-PDCCH), and checks its cyclic redundancy check (CRC) bits included in advance (blind decoding). That is, the physical downlink control channel extracting unit 504 monitors a PDCCH placed in the PDCCH region and an E-PDCCH placed in the PDSCH region, which is different from the PDCCH region. If the CRC bits match an ID preassigned by the base station, the downlink subframe processing unit 503 decides that a PDCCH or an E-PDCCH has been detected and extracts the PDSCH using control information contained in the detected PDCCH or E-PDCCH. More specifically, RE demapping and/or demodulation corresponding to the RE mapping and/or modulation performed at the downlink subframe generating unit 402 is applied. The PDSCH extracted from the received downlink subframes is sent to the codeword extracting unit 505. The codeword extracting unit 505 performs rate matching, error correction decoding, and the like corresponding to the rate matching and error correction coding performed at the codeword generating unit 401 and extracts transport blocks, which are then sent to the higher layer 506. That is, if the physical downlink control channel extracting unit 504 has detected a PDCCH or E-PDCCH, the codeword extracting unit 505 extracts transmit data on the PDSCH associated with the detected PDCCH or E-PDCCH, and sends it to the higher layer 506.

Next, the flow of transmission and reception of HARQ response information for downlink transmit data is described. At the terminal 102, after the codeword extracting unit 505 determines whether transport blocks have been successfully extracted or not, information indicating success/failure is sent to the response information generating unit 507. The response information generating unit 507 generates HARQ response information and sends it to the physical uplink control channel generating unit 509 in the uplink subframe generating unit 508. In the uplink subframe generating unit 508, a PUCCH including the HARQ response information (uplink control information) is generated by the physical uplink control channel generating unit 509 based on parameters sent from the higher layer 506 and the resource in which the PDCCH or E-PDCCH was placed at the physical downlink control channel extracting unit 504, and the generated PUCCH is mapped to RBs of uplink subframes. If the physical downlink control channel extracting unit 504 has detected an E-PDCCH in an E-PDCCH region (part of the PDSCH region), in the uplink subframe generating unit 508, a PUCCH including the HARQ response information (uplink control information) is generated by the physical uplink control channel generating unit 509 according to instructions from the higher layer and the generated PUCCH is mapped to RBs of uplink subframes. That is, the response information is mapped to a PUCCH resource to generate a PUCCH. The SC-FDMA signal transmitting unit 510 applies SC-FDMA modulation to the uplink subframes to generate an SC-FDMA signal, and transmits it via the transmit antenna 511.

At the base station 101, the SC-FDMA signal is received by the SC-FDMA signal receiving unit 407 via the receive antenna 406 and is subjected to SC-FDMA demodulation. The uplink subframe processing unit 408 extracts the RBs to which the PUCCH is mapped according to instructions from the higher layer 410, and the physical uplink control channel extracting unit 409 extracts the HARQ response control information contained in the PUCCH. The extracted HARQ response control information is sent to the higher layer 410. The HARQ response control information is used for HARQ control at the higher layer 410.

Next, PUCCH resources handled in the uplink subframe generating unit 508 will be discussed. HARQ response control information is spread over an SC-FDMA sample region using a cyclically shifted pseudo constant-amplitude zero-auto correlation (CAZAC) sequence, and further spread over four SC-FDMA symbols in a slot using an orthogonal cover code (OCC) having a code length of 4. The symbols spread with the two codes are mapped to two RBs of different frequencies. Thus, a PUCCH resource is defined by three elements: the amount of cyclic shift, an orthogonal code, and mapped RBs. Cyclic shift in the SC-FDMA sample region can also be represented by phase rotation that uniformly increases in frequency domain.

Figure 6:
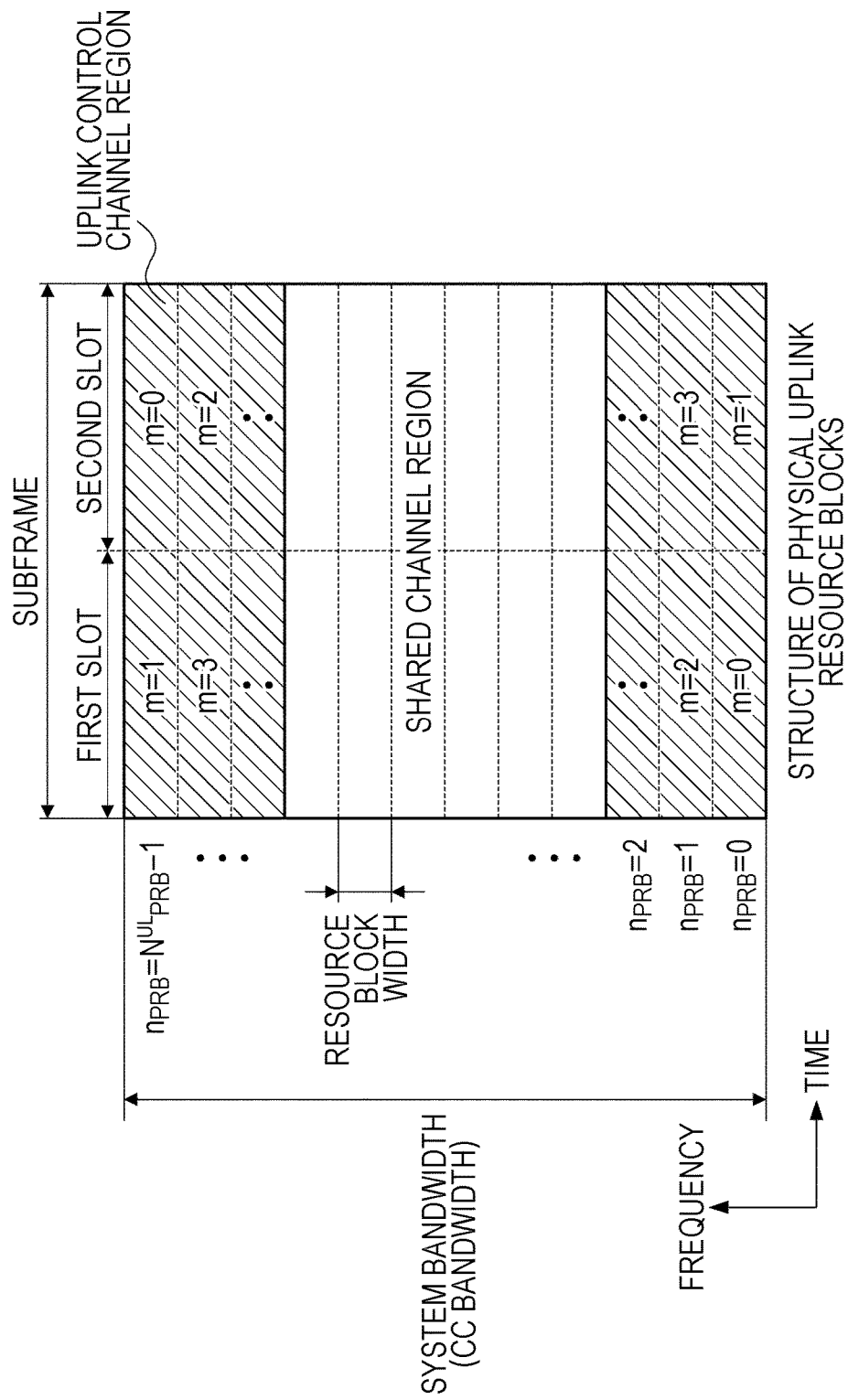
FIG. 6 shows the structure of physical uplink resource blocks in an uplink control channel region to which a PUCCH is assigned in the first embodiment.

FIG. 6 shows the structure of physical uplink resource blocks in an uplink control channel region to which a PUCCH is assigned (uplink control channel physical resources). An RB pair consists of two RBs having different frequencies in a first slot and a second slot. A PUCCH is placed in any of RB pairs with m=0, 1, 2, . . . .

FIG. 7 is a correspondence table showing uplink control channel logical resources. An example of PUCCH resources is shown here representing a case where three orthogonal codes, OC0, OC1, and OC2, six amounts of cyclic shift, CS0, CS2, CS4, CS6, CS8, and CS10, and "m" which indicates a frequency resource are assumed as the elements constituting the PUCCH. A combination of an orthogonal code, an amount of cyclic shift, and a value of m is uniquely defined for each value of $n_{PUCCH}$, which is an index indicating a PUCCH resource (an uplink control channel logical resource). The correspondence between $n_{PUCCH}$ and combinations of an orthogonal code, an amount of cyclic shift, and m illustrated in FIG. 7 is an example and other ways of correspondence are possible. For example, correspondence may be such that the amount of cyclic shift or m varies with consecutive values of $n_{PUCCH}$. Alternatively, CS1, CS3, CS5, CS7, CS9, and CS11 which are amounts of cyclic shift distinct from CS0, CS2, CS4, CS6, CS8, and CS10 may be used. In the shown example, the value of m is equal to or greater than $N_{F2}$. Frequency resources with m smaller than $N_{F2}$ are $N_{F2}$ frequency resources reserved for PUCCH transmission for feeding back channel condition information.

Figure 8:
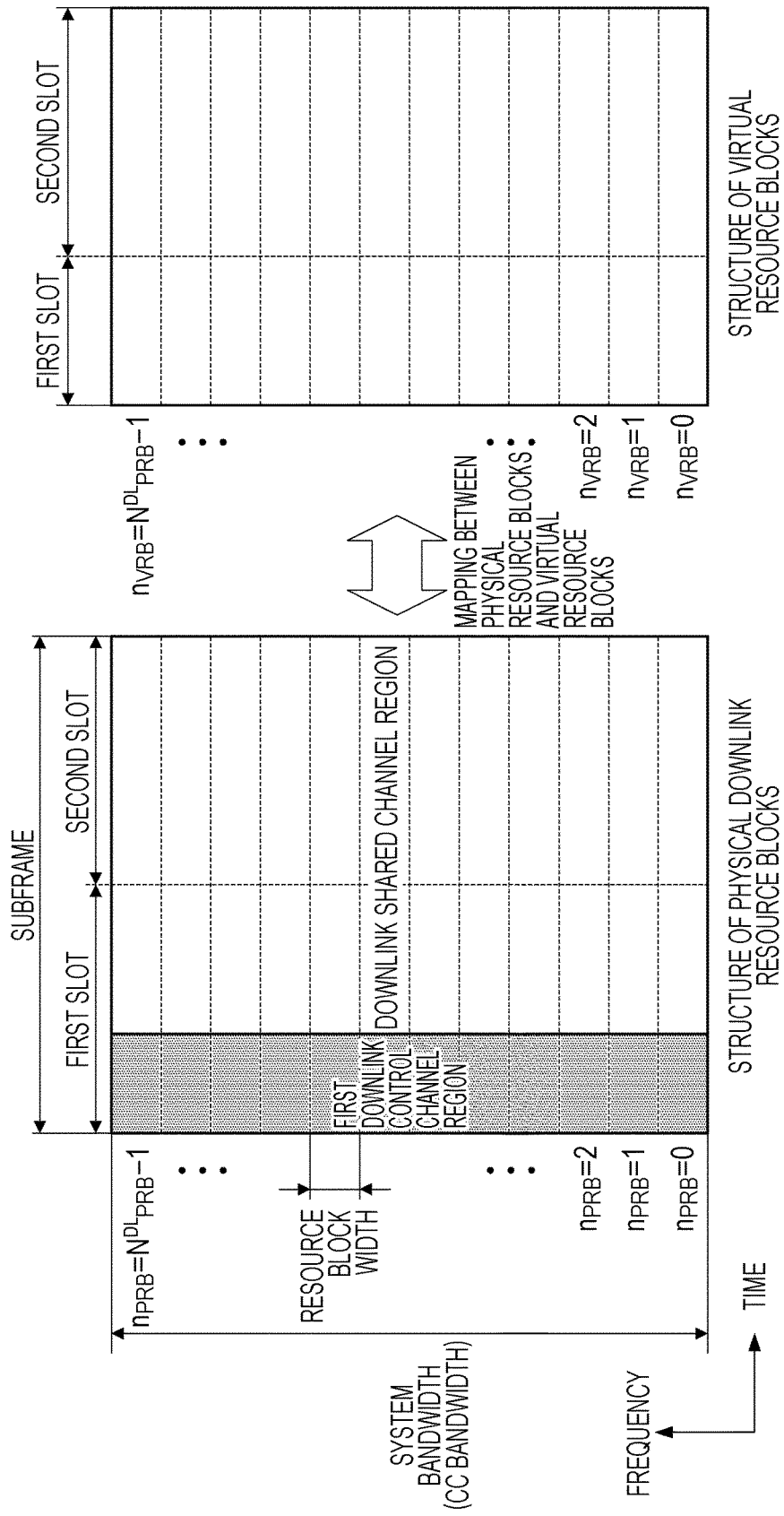
FIG. 8 shows physical resource blocks PRB and virtual resource blocks VRB in PDCCH and PDSCH regions in the first embodiment.

Next, PDCCH and E-PDCCH are described. FIG. 8 shows physical resource blocks PRB (physical RBs) and virtual resource blocks VRB (virtual RBs) in PDCCH and PDSCH regions. An RB in an actual subframe is called PRB, while an RB as a logical resource used for RB assignment is called VRB. $N^{DL}_{PRB}$ is the number of PRBs arranged in frequency direction within a downlink CC. Numbers $n_{PRB}$ are assigned to PRBs (or PRB pairs), where $np_{PRB}$ is 0, 1, 2, . . . , $N^{DL}_{PRB}-1$ in ascending order of frequency. The number of VRBs arranged in frequency direction in a downlink CC is equal to $N^{DL}_{PRB}$. Numbers $n_{VRB}$ are assigned to VRBs (or VRB pairs), where $n_{VRB}$ is 0, 1, 2, . . . , $N^{DL}_{PRB}-1$ in ascending order of frequency. PRBs and VRBs are explicitly or implicitly/tacitly mapped to each other. Numbers as referred to herein may be represented as indices as well.

Figure 9:
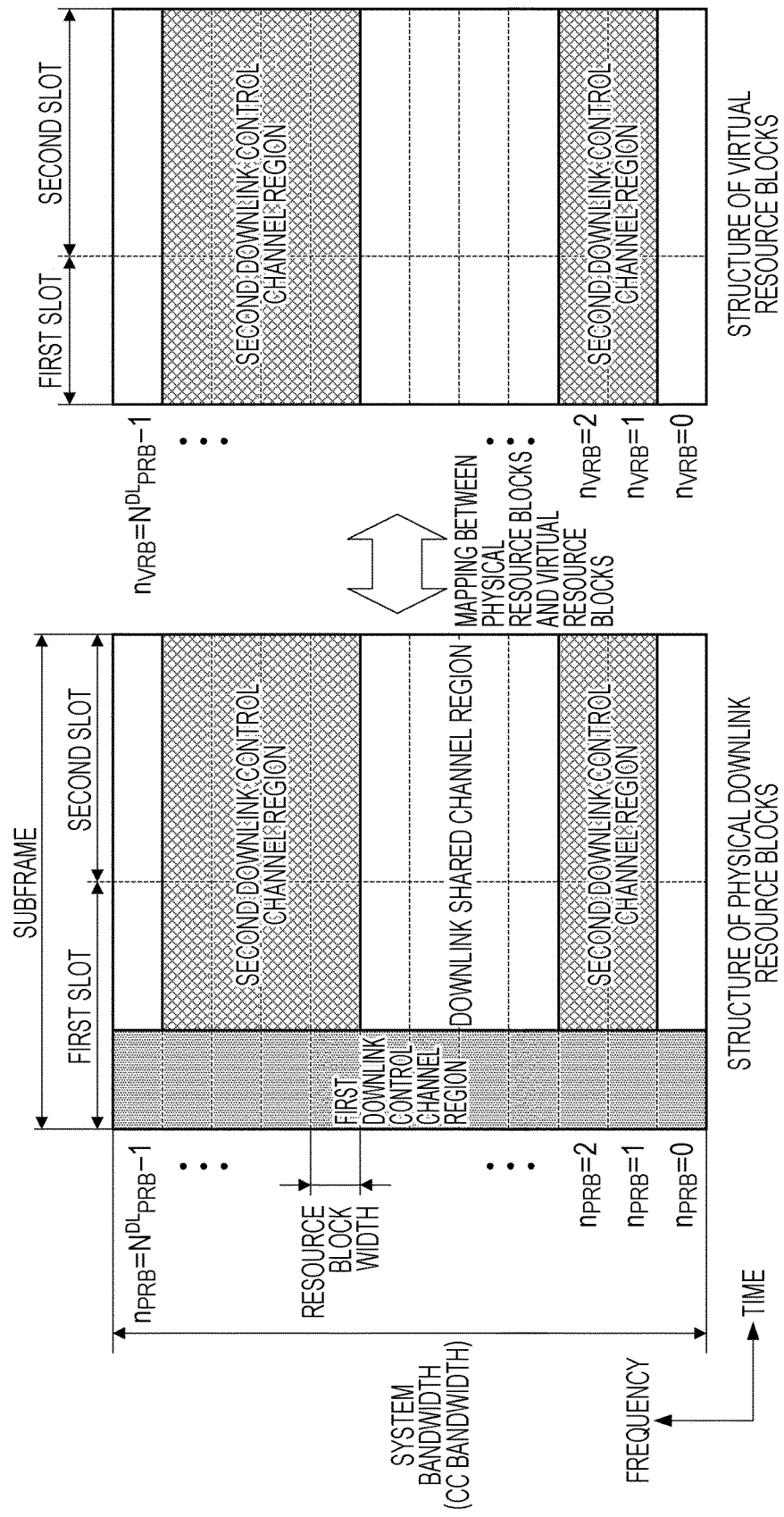
FIG. 9 shows an example of PRB-VRB mapping in E-PDCCH and PDSCH regions in the first embodiment.

Now referring to FIG. 9, an example of mapping between PRBs and VRBs in E-PDCCH region and PDSCH region is shown. In this PRB-VRB mapping scheme, a PRB pair and a VRB pair having the same $n_{PRB}$ and $n_{VRB}$ number are mapped to each other. That is, a modulation symbol for transmit data or control information assigned to REs of a VRB pair with $n_{VRB}$ is mapped to REs of the PRB pair with $n_{PRB}=n_{VRB}$ as it is.

Figure 10:
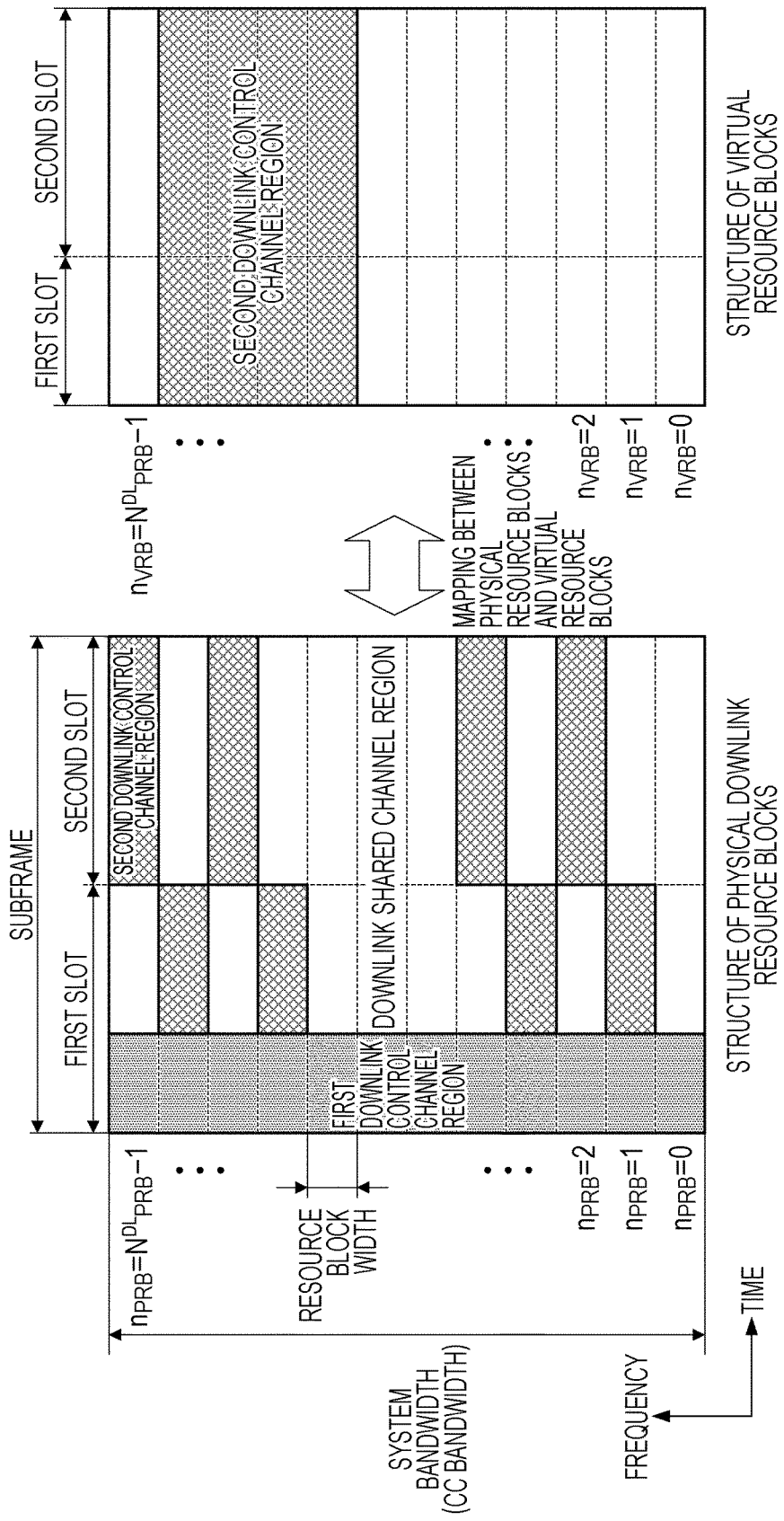
FIG. 10 shows another example of PRB-VRB mapping in E-PDCCH and PDSCH regions in the first embodiment.

Next, referring to FIG. 10, another example of PRB-VRB mapping in E-PDCCH region and PDSCH region is shown. In this PRB-VRB mapping scheme, VRBs that are contiguous on the frequency axis are mapped to PRBs at positions discrete on the frequency axis. Further, the VRB in the first slot and the VRB in the second slot of a VRB pair having the same $n_{VRB}$ number are mapped to PRBs at positions discrete on the frequency axis. However, the VRB from the first slot is mapped to the PRB in the first slot and the VRB from the second slot is mapped to the PRB in the second slot. That is, frequency hopping within a slot and slot hopping (frequency hopping among slots) are applied.

As described, some (or all) of VRB pairs are defined as an E-PDCCH region (a region in which an E-PDCCH can be potentially placed). Further, in accordance with a PRB-VRB mapping scheme specified explicitly or implicitly/tacitly, some (or all) of PRB pairs in the PDSCH region or slot-hopped PRBs are substantially defined as an E-PDCCH region.

Figure 11:
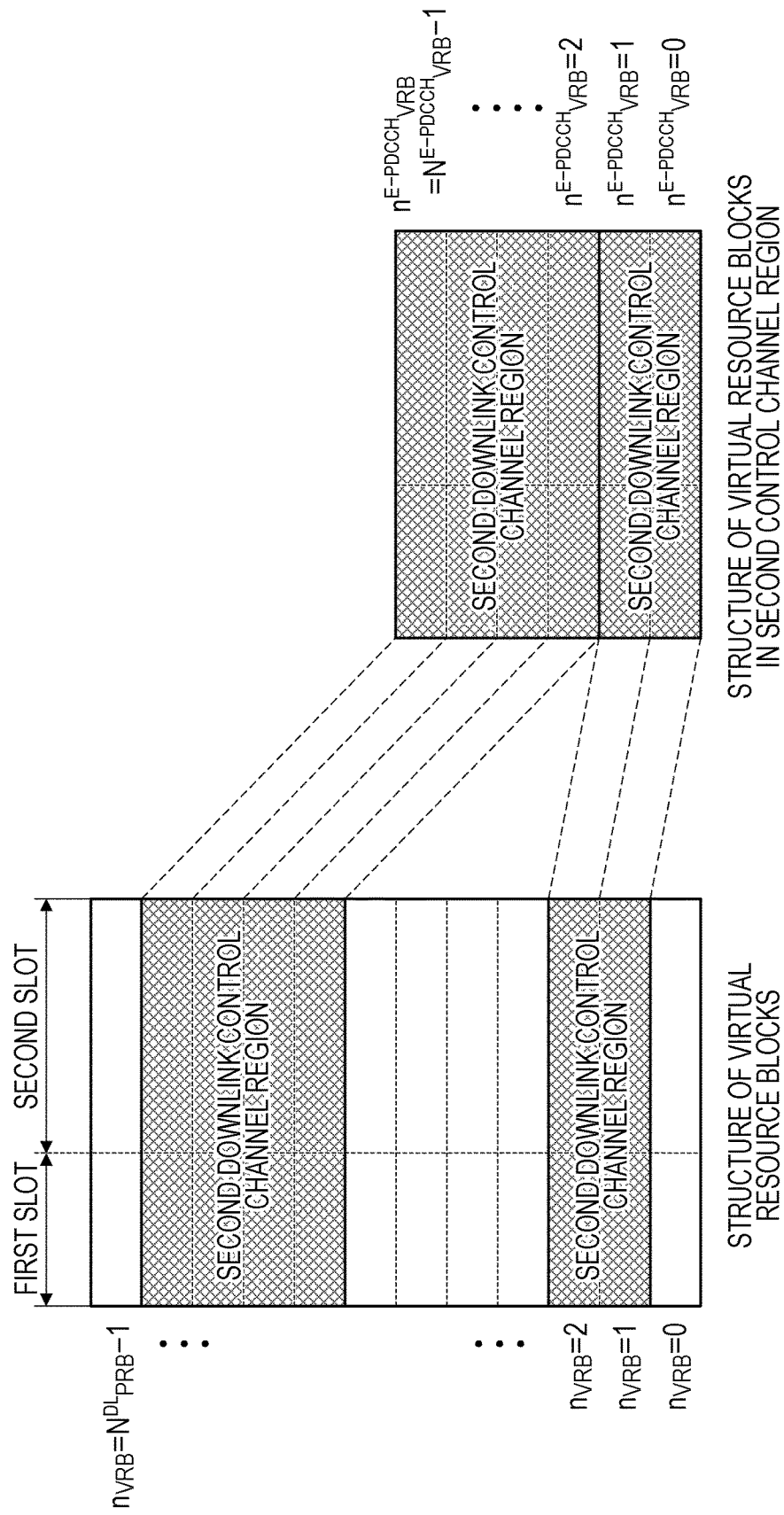
FIG. 11 shows an exemplary numbering of VRBs in an E-PDCCH region in the first embodiment.

FIG. 11 shows an exemplary numbering of VRBs in an E-PDCCH region. Of $N^{DL}_{PRB}$ VRB pairs, $N^{E-PDCCH}_{VRB}$ pairs that are configured in an E-PDCCH region are taken, and assigned VRB number $n^{E-PDCCH}_{VRB}$ for the E-PDCCH region as 0, 1, 2, ..., $N^{E-PDCCH}_{VRB}-1$ starting with the VRB pair of the lowest frequency. That is, in frequency domain, a set of $N^{E-PDCCH}_{VRB}$ VRBs is configured for potential E-PDCCH transmission through signaling from the higher layer (e.g., individual signaling to terminals or common signaling in a cell).

Figure 12:
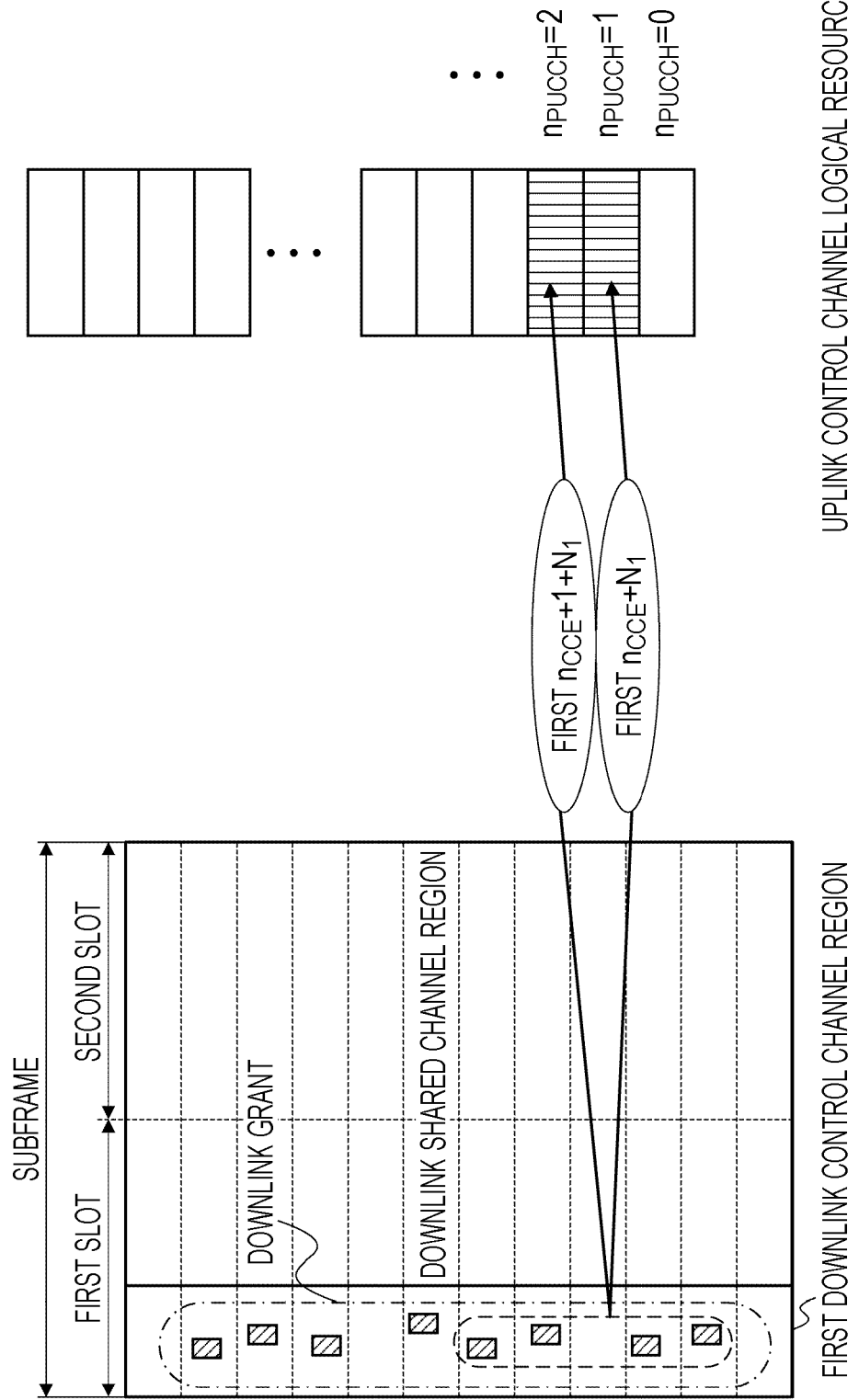
FIG. 12 illustrates the structure of PDCCH and assignment of PUCCH resources in the first embodiment.

Next, the structure of PDCCH and assignment of PUCCH resources are described. FIG. 12 illustrates the structure of a PDCCH and assignment of PUCCH resources. A PDCCH consists of multiple control channel elements (CCE) in the PDCCH region. A CCE consists of multiple downlink resource elements (resources each defined by one OFDM symbol and one sub-carrier).

CCEs in the PDCCH region are given number $n_{CCE}$ for identifying the CCEs. The CCEs are numbered according to a predefined rule. A PDCCH consists of a set of multiple CCEs (CCE aggregation). The number of CCEs constituting such a set is called CCE aggregation level. The CCE aggregation level for constructing the PDCCH is configured at the base station 101 according to the coding rate set for the PDCCH and the number of bits in downlink control information (DCI) (control information sent on the PDCCH or E-PDCCH) included in the PDCCH. Combinations of CCE aggregation levels that can be used for a terminal are predetermined. Also, a set of n CCEs is called "CCE aggregation level n".

A RE group (REG) consists of four REs contiguous in frequency domain. Further, a CCE consists of nine different REGs distributed in frequency domain and time domain within the PDCCH region. Specifically, interleaving is applied in units of REG to all REGs that have been numbered in the entire downlink CC using a block interleaver, and nine contiguous REGs after the interleaving constitute one CCE.

For each terminal, a search space (SS), which is a region in which to search for the PDCCH, is configured. An SS consists of multiple CCEs. CCEs are numbered beforehand, and an SS consists of CCEs having consecutive numbers. The number of CCEs that constitute a certain SS is predetermined. An SS for each CCE aggregation level consists of a set of multiple PDCCH candidates. SS is classified into cell-specific search space (CSS or cell-specific SS) for which the number of the CCE having the smallest number among the CCEs constituting the SS is common in a cell, and terminal-specific search space (USS or UE-specific SS) for which the smallest CCE number is specific to a terminal. In the CSS, a PDCCH to which control information intended for multiple terminals 102 such as system information and paging information is assigned (or included), or a PDCCH to which a downlink/uplink grant indicating a command for fallback to a lower-level transmission scheme or random access is assigned (or included) can be placed.

The base station 101 transmits the PDCCH using one or more CCEs included in the SS which is configured at the terminal 102. The terminal 102 decodes the received signal using one or more CCEs in the SS and performs processing for detecting any PDCCH intended to the terminal. As mentioned earlier, this process is called blind decoding. The terminal 102 configures different SSs for different CCE aggregation levels. The terminal 102 then performs blind decoding using a predetermined combination of CCEs in the SS which is distinct from one CCE aggregation level to another. In other words, the terminal 102 performs blind decoding on PDCCH candidates in SSs that vary among CCE aggregation levels. The series of actions thus conducted at the terminal 102 is called PDCCH monitoring.

Upon detecting a downlink grant in the PDCCH region, the terminal 102 reports HARQ response information for downlink transmit data (PDSCH) corresponding to the downlink grant using a PUCCH resource corresponding to the CCE index of the CCE having the lowest CCE index among the CCEs constructing the PDCCH including the downlink grant. Reversely, when placing a PDCCH containing a downlink grant, the base station 101 places the PDCCH in CCEs that correspond to the PUCCH resource in which the terminal 102 will report HARQ response information for downlink transmit data (PDSCH) corresponding to the downlink grant. The base station 101 receives the HARQ response information corresponding to the PDSCH sent to the terminal 102 via the PUCCH which it has scheduled. More specifically, as shown in FIG. 12, among the CCEs that constitute a PDCCH containing a downlink grant, a PUCCH resource that has an index $n_{PUCCH}$ equal to the sum of the CCE number $n_{CCE}$ of the first CCE and $N_1$, which is a cell specific parameter, represents the PUCCH resource assigned for HARQ response information of downlink transmit data corresponding to the downlink grant.

It is also possible that multiple PUCCH resources are required for one PDCCH, such as when there are two or more pieces of HARQ response information because two or more codewords are included in downlink transmit data corresponding to a downlink grant or when one piece of response information is sent by diversity transmission using multiple PUCCH resources, for example. In such a case, of the CCEs constituting the PDCCH containing the downlink grant, the PUCCH resource corresponding to the smallest CCE number and also a PUCCH resource having an index larger than that PUCCH resource by one are used. More specifically, as shown in FIG. 12, among the CCEs constituting the PDCCH containing the downlink grant, the PUCCH resource having an index $n_{PUCCH}$ equal to the sum of the CCE number $n_{CCE}$ of the first CCE and cell-specific parameter $N_1$, and the PUCCH resource having an index $n_{PUCCH}$ equal to the sum of the CCE number $n_{CCE}$ of the first CCE, one, and the cell-specific parameter $N_1$ represent the PUCCH resources assigned for HARQ response information of downlink transmit data corresponding to the downlink grant. If two or more PUCCH resources are required, PUCCH resources having indices which are larger by one may be used in a similar manner.

Figure 13:
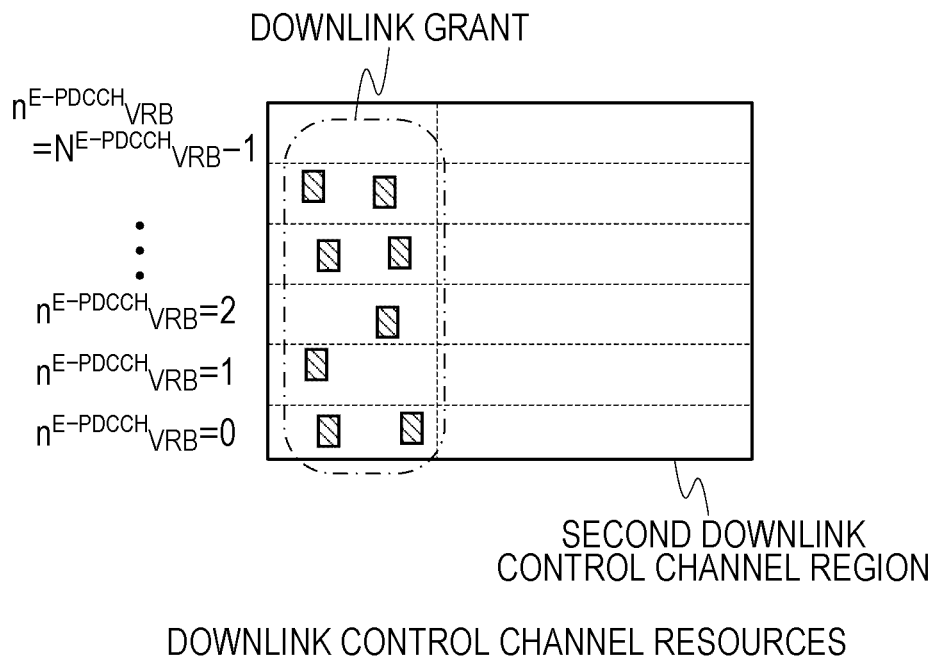
FIG. 13 illustrates the structure of E-PDCCH in the first embodiment.

Next, the structure of E-PDCCH is described. FIG. 13 shows the structure of E-PDCCH. Note that the E-PDCCH illustrated in FIG. 13 is one that employs cross-interleaving (a type of interleaving in which individual elements constituting an E-PDCCH are positioned across RBs, also called block interleaving). An E-PDCCH consists of multiple CCEs in an E-PDCCH region. Specifically, like a PDCCH, an REG consists of four REs contiguous in frequency domain. A CCE consists of nine different REGs distributed in frequency domain and time domain in the E-PDCCH region. In the E-PDCCH region, individual E-PDCCHs are positioned in the first slot and the second slot. CCEs in the E-PDCCH region are assigned numbers (indices) $n^{E-PDCCH}_{CCE}$ for identifying the CCEs. In the E-PDCCH region, CCEs are independently placed in the first slot and the second slot and numbers for identifying the CCEs are also independently assigned.

Figure 14:
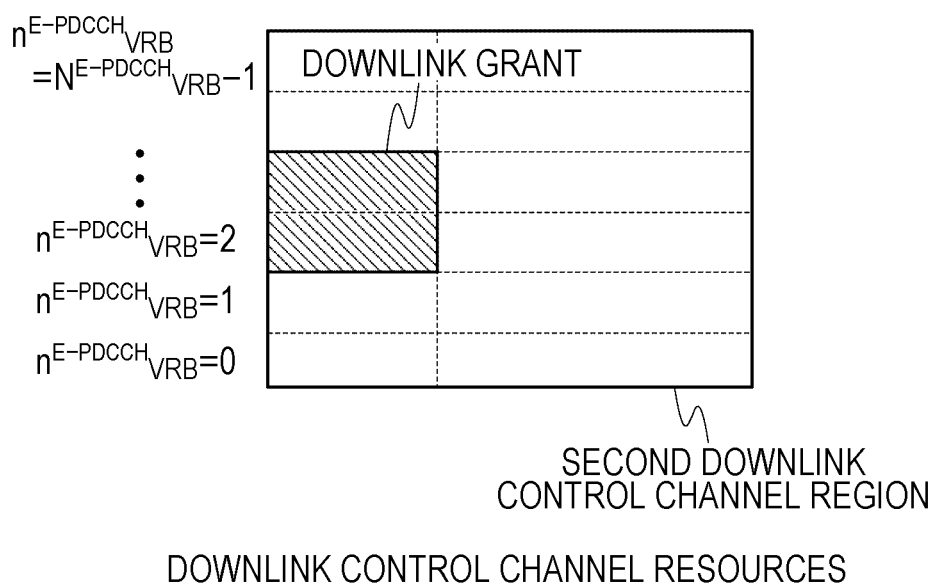
FIG. 14 illustrates the structure of E-PDCCH in the first embodiment.

Next, another example of E-PDCCH structure is shown. FIG. 14 illustrates the structure of an E-PDCCH, which does not employ cross interleaving. The E-PDCCH consists of multiple VRBs in the E-PDCCH region. Specifically, unlike the PDCCH, the E-PDCCH is made up of VRBs instead of CCEs, being structured as a set of one or more contiguous VRBs. The number of VRBs constituting such a set is called VRB aggregation level. That is, in an E-PDCCH region to which cross interleaving is not applied, an SS consists of multiple VRBs. The VRB aggregation level with which to construct an E-PDCCH is configured at the base station 101 according to the coding rate set for the E-PDCCH and the number of bits in DCI to be included in the E-PDCCH. Combinations of VRB aggregation levels that can be used for the terminal 102 are predetermined, and the terminal 102 performs blind decoding using the predetermined combinations of VRBs in a SS. In the E-PDCCH region, individual E-PDCCHs are positioned in the first slot and the second slot. VRBs in the E-PDCCH region are assigned numbers (indices) $n^{E-PDCCH}_{VRB}$ for identifying the VRBs. In the E-PDCCH region, VRBs constituting individual E-PDCCHs are placed in the first slot and the second slot and numbers for identifying the VRBs are also independently assigned.

Figure 15:
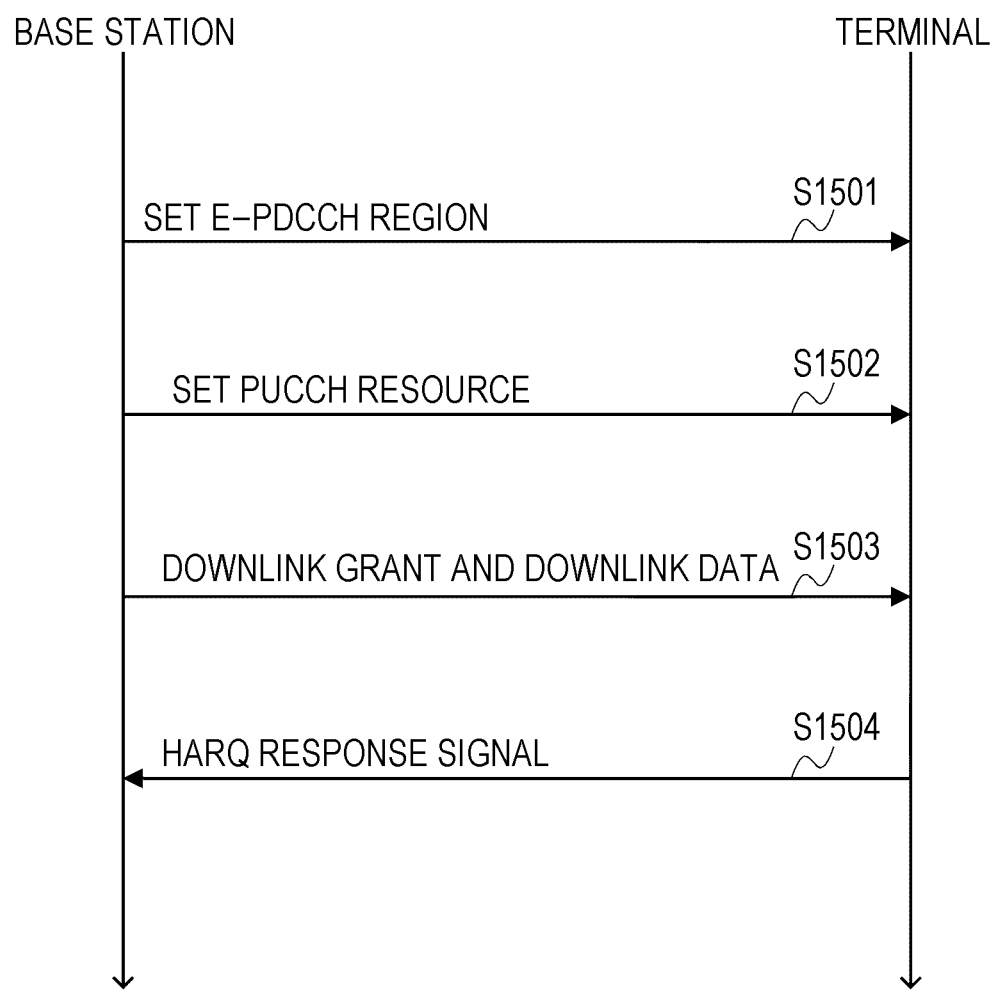
FIG. 15 shows the flow of a downlink data transmission and response procedure between the base station and the terminal according to the first embodiment.

FIG. 15 illustrates the flow of a downlink data transmission and response procedure between the base station 101 and terminal 102. The base station 101 notifies the terminal 102 of control information specifying (configuring, indicating) an E-PDCCH region using individual signaling addressed to each terminal 102 (RRC signaling), and the terminal 102 configures an E-PDCCH region (a potential E-PDCCH) based on the control information (step S1501). Here, for specifying the E-PDCCH region, a scheme that specifies some or all of RBs within a frequency band is employed as mentioned above. Alternatively, in combination with the scheme, some subframes in time domain may be specified as subframes in which the E-PDCCH can be placed. For example, a scheme of specifying a subframe interval and an offset from a reference subframe may be used. Alternatively, it is possible to represent in bit map form whether an E-PDCCH can be placed in a radio frame (10 subframes) or subframes in multiple radio frames. Information indicating whether cross interleaving is applied or not is also provided.

Then, the base station 101 uses RRC signaling to notify the terminal 102 of control information specifying $n^1_{PUCCH,RRC}$, which is a parameter indicating PUCCH resources that can be configured individually for each terminal 102, and the terminal 102 configures $n^1_{PUCCH,RRC}$ based on the control information (step S1502). While the base station 101 configures an E-PDCCH region and thereafter $n^1_{PUCCH,RRC}$ is configured in the illustrated example, this is not limitative. For example, the base station 101 may configure $n^1_{PUCCH,RRC}$ and then the E-PDCCH region, or the E-PDCCH region and $n^1_{PUCCH,RRC}$ may be configured at the same time. Also, multiple PUCCH resources can be required for reporting HARQ information at a time, such as when a terminal transmits a PUCCH using multiple antenna ports and different PUCCH resources for different antennas. In such a case, multiple values of $n^1_{PUCCH,RRC}$ may be configured, such as by configuring $n^1_{PUCCH,RRC}$ per antenna port. Here, $n^1_{PUCCH,RRC}$ is preferably a value equal to or smaller than (or a value smaller than) $N_1$ of FIG. 12. That is, the possible value of $n^1_{PUCCH,RRC}$ is between 0 and $N_1-1$. This eliminates the possibility of collision between a PUCCH resource for the PDCCH and a PUCCH resource for the E-PDCCH and thus reduces scheduling load.

Then, using the PDCCH or E-PDCCH, the base station 101 transmits a downlink grant and downlink transmit data corresponding to the downlink grant to the terminal 102, which receives the downlink grant and downlink transmit data (step S1503). After receiving the downlink transmit data, the terminal 102 generates HARQ response information.

Finally, the terminal 102 selects a PUCCH resource in accordance with the resource used for the downlink grant detected at step S1503, and uses the selected PUCCH resource to report the HARQ response information (step S1504). More specifically, as illustrated in FIG. 16, if the channel used for transmission of the downlink grant at step S1502 is a PDCCH in the PDCCH region, the terminal 102 selects a PUCCH resource having an index calculated from the index of the first (the smallest) one of the CCEs that constitute the PDCCH. If the channel used for transmission of the downlink grant is an E-PDCCH in the E-PDCCH region, the terminal 102 selects a PUCCH resource indicated by the $n^1_{PUCCH,RRC}$ notified at step 1502. Thereafter, the terminal 102 uses the selected PUCCH resource to report HARQ response information for PDSCH (transmit data on the PDSCH) associated with the PDCCH or E-PDCCH that was detected. In a case where multiple values of $n^1_{PUCCH,RRC}$ are configured, the terminal 102 uses multiple PUCCH resources that have been configured to report HARQ response information.

Alternatively, as shown in FIG. 17, if the channel used for transmission of the downlink grant at step S1502 is a PDCCH in the PDCCH region, the terminal 102 selects a PUCCH resource having an index calculated from the index of the first (the smallest) one of the CCEs constituting the PDCCH. If the channel used for transmission of the downlink grant is an E-PDCCH in the E-PDCCH region and the E-PDCCH is a cross-interleaved E-PDCCH, the terminal 102 selects a PUCCH resource having an index calculated from the index of the first (the smallest) one of the CCEs constituting the PDCCH. If the channel used for transmission of the downlink grant is an E-PDCCH in the E-PDCCH region and the E-PDCCH is not cross-interleaved, the terminal 102 selects a PUCCH resource indicated by the $n^1_{PUCCH,RRC}$ notified at step 1502. The terminal 102 then uses the selected PUCCH resource to report HARQ response information for the PDSCH (transmit data on the PDSCH) associated with the PDCCH or E-PDCCH that was detected.

Figure 18:
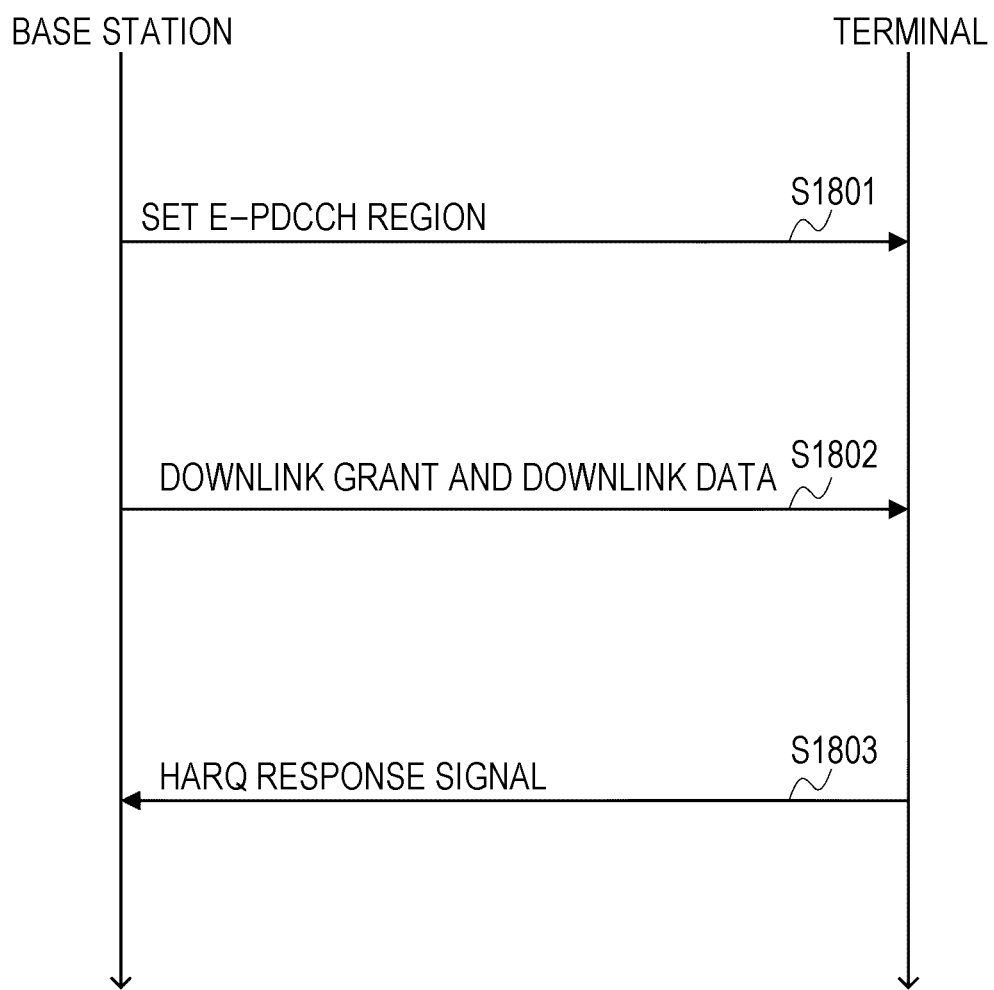
FIG. 18 shows the flow of a downlink data transmission and response procedure between the base station and the terminal in the first embodiment.

FIG. 18 shows another flow of a downlink data transmission and response procedure between the base station 101 and the terminal 102. As with the procedure shown in FIG. 15, the base station 101 notifies the terminal 102 of control information specifying (configuring, indicating) an E-PDCCH region using individual signaling (RRC signaling) addressed to each terminal 102, and the terminal 102 configures the E-PDCCH region (a potential E-PDCCH) based on the control information (step S1801).

Unlike the procedure of FIG. 15, the base station 101 does not notify the terminal 102 of control information specifying $n^1_{PUCCH,RRC}$ a parameter indicating PUCCH resources that can be configured individually for each terminal 102, using RRC signaling. The terminal 102 accordingly does not configure $n^1_{PUCCH,RRC}$ based on control information.

The base station 101 then sends a downlink grant and downlink transmit data corresponding to the downlink grant using a PDCCH or E-PDCCH to the terminal 102, which receives the downlink grant and downlink transmit data (step S1803). After receiving the downlink transmit data, the terminal 102 generates HARQ response information.

Finally, the terminal 102 reports the HARQ response information using a PUCCH resource corresponding to the resource used for the downlink grant detected at step S1803 (step S1804). More specifically, if the channel used for transmission of the downlink grant at step S1502 is a PDCCH in the PDCCH region, or if the channel used for transmission of the downlink grant is an E-PDCCH in the E-PDCCH region and the E-PDCCH is a cross-interleaved E-PDCCH, the terminal 102 uses a PUCCH resource having an index calculated from the index of the first (the smallest) one of the CCEs constituting the PDCCH. If the channel used for transmission of the downlink grant is an E-PDCCH in the E-PDCCH region and the E-PDCCH is not cross-interleaved, the terminal 102 uses a PUCCH resource having an index calculated from the index of the first (the smallest) one of the VRBs constituting the PDCCH to report HARQ response information for the PDSCH (transmit data on the PDSCH) associated with the PDCCH or E-PDCCH that was detected.

In other words, if the channel used for transmission of the downlink grant is an E-PDCCH in an E-PDCCH region and if $n^1_{PUCCH,RRC}$, parameter indicating a PUCCH resource, is not specified via RRC signaling, the terminal 102 calculates the PUCCH resource index from the index of the first (smallest) one of elements (CCEs or VRBs) constituting the detected E-PDCCH, and uses the PUCCH resource having the calculated index to report HARQ response information for PDSCH (transmit data on the PDSCH) associated with the E-PDCCH.

As described, the base station 101 explicitly specifies (configures, indicates) beforehand to the terminal 102 an uplink control channel resource (a prescribed physical uplink control channel resource) to be used for reporting HARQ response information corresponding to downlink transmit data. When transmitting downlink transmit data in relation to a downlink grant in a PDCCH region, the base station 101 assigns the downlink grant to a PDCCH resource that corresponds to the uplink control channel resource that will be used for reporting HARQ response information corresponding to the downlink transmit data. Further, when the base station 101 sent downlink transmit data in relation to a downlink grant in a PDCCH region, the base station 101 monitors the uplink control channel resource corresponding to the PDCCH resource used for transmission of the downlink grant to extract HARQ response information. When the base station 101 sent downlink transmit data in relation to a downlink grant in an E-PDCCH region, the base station 101 monitors an uplink control channel resource it specified (configured, indicated) in advance to extract HARQ response information.

If the terminal 102 has detected a downlink grant in a PDCCH region, it reports HARQ response information for downlink transmit data associated with the downlink grant using a PUCCH resource that is uniquely determined from the PDCCH resource used for transmission of the downlink grant. If the terminal 102 has detected a downlink grant in an E-PDCCH region, it reports HARQ response information for downlink transmit data associated with the downlink grant using the PUCCH resource that was specified (configured, indicated) by the base station 101 in advance. That is, the terminal 102 changes the procedure to select the PUCCH resource (or the PUCCH resource itself) depending on whether the channel used is a PDCCH or E-PDCCH.

This allows an uplink control channel to be allocated to the terminal even when a downlink grant is transmitted and received using an E-PDCCH. Also, the uplink control channel to be used is uniquely determined when transmission of a downlink grant using a PDCCH and transmission of a downlink grant using an E-PDCCH are dynamically switched. Consequently, uplink control channels can be utilized efficiently.

The base station 101 explicitly specifies (configures, indicates) to the terminal 102 beforehand an uplink control channel resource to be used for reporting HARQ response information corresponding to downlink transmit data. When transmitting downlink transmit data in relation to a downlink grant in a PDCCH region or when transmitting downlink transmit data in relation to a downlink grant in an E-PDCCH region which is cross-interleaved, the base station 101 assigns the downlink grant to a PDCCH resource or E-PDCCH resource that corresponds to the uplink control channel resource to be used for reporting HARQ response information corresponding to that downlink transmit data. Further, when the base station 101 sent downlink transmit data in relation to a downlink grant in a PDCCH region or an E-PDCCH region which is cross-interleaved, the base station 101 monitors an uplink control channel resource corresponding to the PDCCH resource or E-PDCCH resource used for transmission of the downlink grant to extract HARQ response information. When the base station 101 sent downlink transmit data in relation to a downlink grant in an E-PDCCH region not cross-interleaved, it monitors the uplink control channel resource it specified (configured, indicated) in advance to extract HARQ response information.

Upon detecting a downlink grant in a PDCCH region or an E-PDCCH region which is cross-interleaved, the terminal 102 reports HARQ response information for downlink transmit data associated with the downlink grant using the PUCCH resource that is uniquely determined from the PDCCH resource or E-PDCCH resource used for transmission of the downlink grant. If the terminal 102 detects a downlink grant in an E-PDCCH region not cross-interleaved, it reports HARQ response information for downlink transmit data associated with the downlink grant using the PUCCH resource that was specified (configured, indicated) by the base station 101 in advance. That is, the terminal 102 changes the procedure to select the PUCCH resource (or the PUCCH resource itself) depending on whether the channel used is a PDCCH or E-PDCCH, or whether the channel is cross-interleaved or not.

This allows an uplink control channel to be allocated to the terminal even when a downlink grant is transmitted and received using an E-PDCCH. Also, the uplink control channel to be used is uniquely determined when transmission of a downlink grant using a PDCCH and transmission of a downlink grant using an E-PDCCH are dynamically switched. Consequently, uplink control channels can be utilized efficiently.

The base station 101 does not explicitly specify (configure, indicate) to the terminal 102 beforehand an uplink control channel resource to be used for reporting HARQ response information corresponding to downlink transmit data. When transmitting downlink transmit data in relation to a downlink grant in a PDCCH region or an E-PDCCH region, the base station 101 assigns the downlink grant to a PDCCH resource or E-PDCCH resource corresponding to the uplink control channel resource to be used for reporting HARQ response information corresponding to the downlink transmit data. The base station 101 further monitors the uplink control channel resource corresponding to the PDCCH resource or E-PDCCH resource used for transmission of the downlink grant to extract HARQ response information.

When an uplink control channel resource to be used for reporting HARQ response information corresponding to downlink transmit data is not explicitly specified (configured, indicated) to the terminal 102 from the base station 101 in advance, the terminal 102 reports HARQ response information for downlink transmit data associated with a downlink grant using the PUCCH resource that is uniquely determined from the PDCCH resource or E-PDCCH resource used for transmission of the downlink grant.

This allows an uplink control channel to be allocated to a terminal even in a case an uplink control channel is not configured in advance. Also, the uplink control channel to be used is uniquely determined when transmission of a downlink grant using a PDCCH and transmission of a downlink grant using an E-PDCCH are dynamically switched. Consequently, uplink control channels can be utilized efficiently.

Second Embodiment

In the first embodiment described above, a PUCCH resource is explicitly signaled when a downlink grant is transmitted using an E-PDCCH. In the second embodiment of the invention described below, when a downlink grant is transmitted using an E-PDCCH, multiple PUCCH resources (prescribed multiple physical uplink control channel resources) are explicitly signaled and one of those PUCCH resources is dynamically specified. The communications system in this embodiment can employ a similar configuration to the communications system shown in FIG. 1. The configurations of the base station 101 and terminal 102 in this embodiment may be similar to the functional blocks shown in FIGS. 4 and 5.

Figures 19, 20:
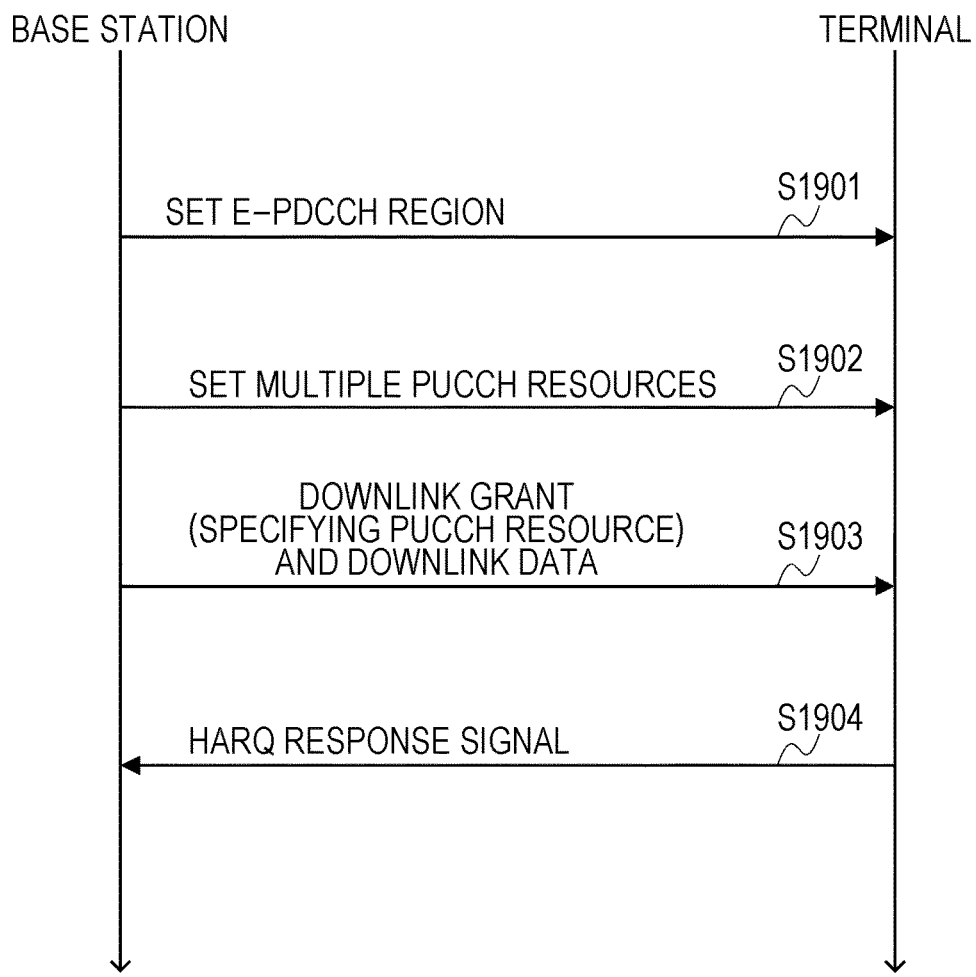
FIG. 19 shows the flow of a downlink data transmission and response procedure between the base station and the terminal according to a second embodiment of the invention.
FIG. 20 is a table showing correspondence between indices and multiple PUCCH resources in the second embodiment.

FIG. 19 shows the flow of a downlink data transmission and response procedure between the base station 101 and the terminal 102. The base station 101 notifies the terminal 102 of control information specifying (configuring, indicating) an E-PDCCH region using individual signaling (RRC signaling) addressed to each terminal 102, and the terminal 102 configures an E-PDCCH region (a potential E-PDCCH) according to the control information (step S1901). The E-PDCCH region may be specified as described in relation to FIG. 15.

Next, the base station 101 uses RRC signaling to notify the terminal 102 of control information specifying multiple values of $n^1_{PUCCH,RRC}$ which is a parameter indicating PUCCH resources that can be configured for each terminal 102, and the terminal 102 configures $n^1_{PUCCH,RRC}$ based on the control information (step S1902). More specifically, as shown in FIG. 20, control information which specifies (configures, indicates) $n^1_{PUCCH,RRC}$ values (four values A, B, C, and D here) respectively corresponding to a prescribed number of indices (four indices 0 to 3 here) is provided from the base station 101 to the terminal 102.

While the base station 101 configures an E-PDCCH region and thereafter $n^1_{PUCCH,RRC}$ is configured in the illustrated example, this is not limitative. For example, the base station 101 may configure $n^1_{PUCCH,RRC}$ and then the E-PDCCH region, or the E-PDCCH region and v may be configured at the same time. Also, multiple PUCCH resources can be required for reporting HARQ information at a time, such as when a terminal transmits a PUCCH using multiple antenna ports and different PUCCH resources for different antennas. In such a case, multiple values of $n^1_{PUCCH,RRC}$ may be configured for respective antenna ports, for example.

Then, using the E-PDCCH, the base station 101 transmits a downlink grant and downlink transmit data corresponding to the downlink grant to the terminal 102, which receives the downlink grant and downlink transmit data (step S1903). DCI serving as the downlink grant includes information specifying a PUCCH resource. For example, the DCI has a bit field (two bits here) for specifying a PUCCH resource. After receiving the downlink transmit data, the terminal 102 generates HARQ response information.

Finally, the terminal 102 reports HARQ response information using the PUCCH resource based on the bit sequence indicated in the bit field of the downlink grant detected at step S1903 (step S1904). More specifically, a bit sequence mapped to the DCI's bit field specifies one of $n^1_{PUCCH,RRC}$ values that were configured at step 1902. For example, as shown in FIG. 20, bit sequences corresponding to a prescribed number of indices (four indices 0 to 3 here) and $n^1_{PUCCH,RRC}$ values (four values A, B, C, and D here) are predefined, and a PUCCH resource having the value of $n^1_{PUCCH,RRC}$ (one of A, B, C, and D here) corresponding to the bit sequence mapped to the bit field as the index is used to report HARQ response information.

While the number of PUCCH resources that are configured at step 1902 and the number of PUCCH resources that can be specified at step 1903 were both described as four, they may be other numbers of course. Also, the bit field in DCI for specifying a PUCCH resource may be a dedicated bit field for specifying a PUCCH resource or may be used also for specifying other parameters in addition to a PUCCH resource.

Figures 21, 22:
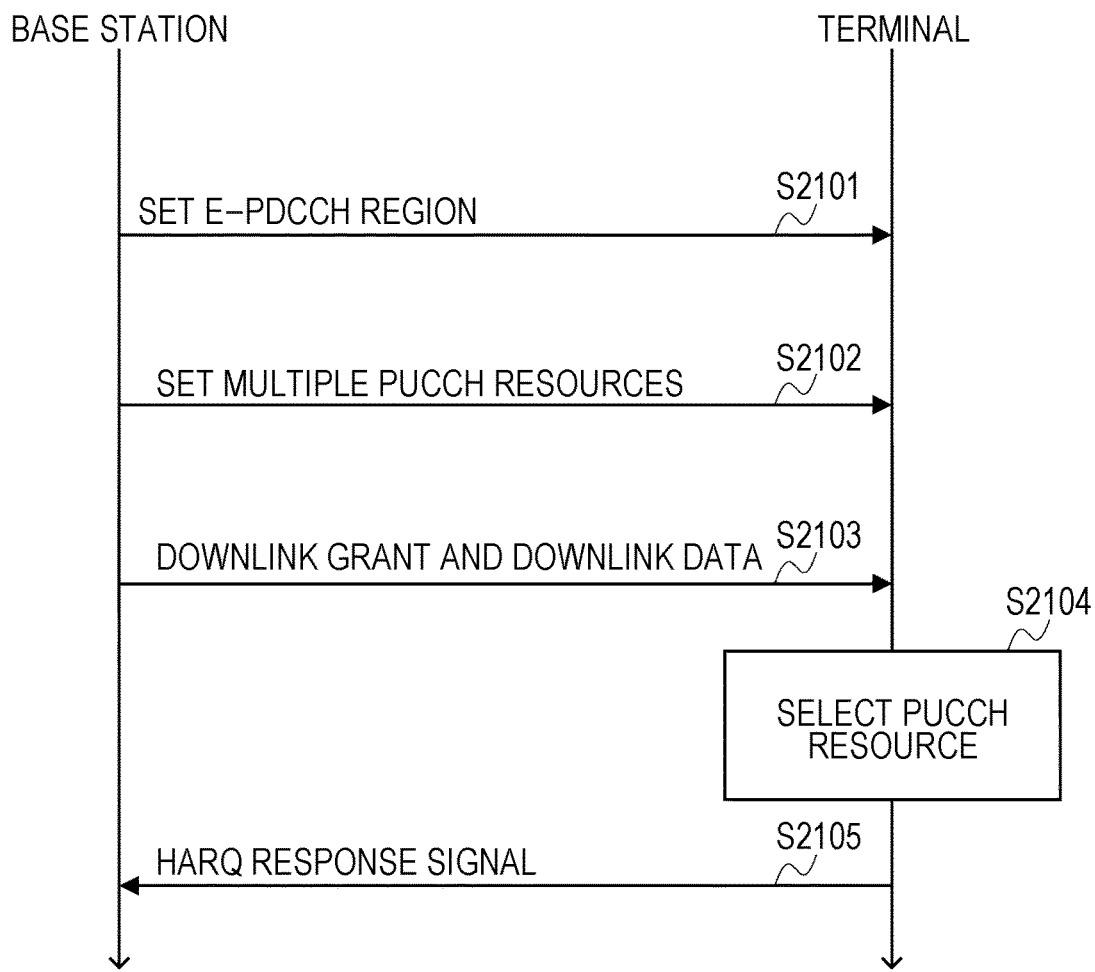
FIG. 21 shows the flow of a downlink data transmission and response procedure between the base station and the terminal according to the second embodiment.
FIG. 22 is a table showing correspondence between indices and multiple PUCCH resources in the second embodiment.
Figure 23:
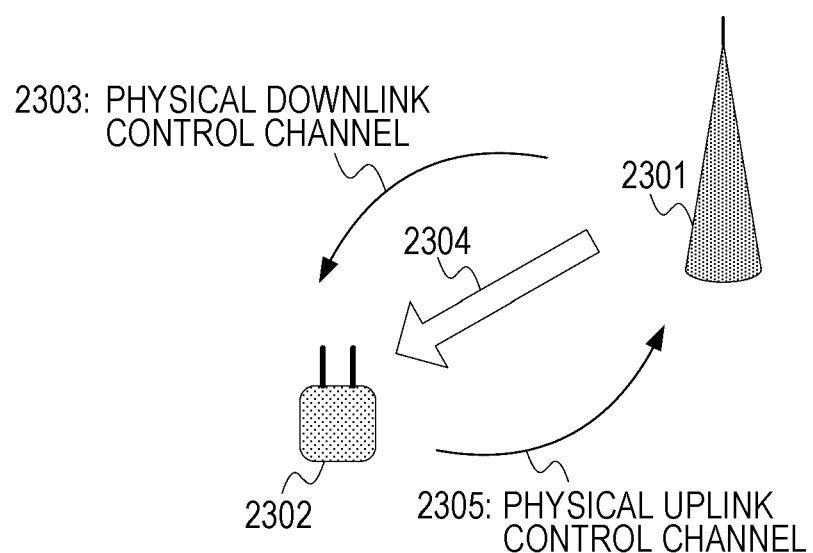
FIG. 23 shows an exemplary configuration of a communications system.

FIG. 21 shows another flow of a downlink data transmission and response procedure between the base station 101 and terminal 102. The base station 101 notifies the terminal 102 of control information specifying (configuring, indicating) an E-PDCCH region using individual signaling addressed to each terminal 102 (RRC signaling), and the terminal 102 configures an E-PDCCH region (a potential E-PDCCH) based on the control information (step S2101). The E-PDCCH region may be specified as described in relation to FIG. 15.

Then, the base station 101 uses RRC signaling to notifies the terminal 102 of control information specifying multiple values of $n^1_{PUCCH,RRC}$ which is a parameter indicating PUCCH resources that can be configured for each terminal 102, and the terminal 102 configures $n^1_{PUCCH,RRC}$ based on the control information (step S2102). More specifically, as shown in FIG. 22, control information which specifies (configures, indicates) $n^1_{PUCCH,RRC}$ values (four values A, B, C, and D here) respectively corresponding to a prescribed number of indices (four indices 0 to 3 here) is provided from the base station 101 to the terminal 102.

Then, using the E-PDCCH, the base station 101 transmits a downlink grant and downlink transmit data corresponding to the downlink grant to the terminal 102, which receives the downlink grant and downlink transmit data (step S2103). After receiving the downlink transmit data, the terminal 102 generates HARQ response information.

The terminal 102 then selects a PUCCH resource based on the downlink grant detected at step S2103 (step S2104). In other words, the downlink grant implicitly/tacitly specifies one of the multiple PUCCH resources configured at step S2102 and the terminal 102 selects the PUCCH resource implicitly/tacitly specified by the downlink grant. For example, such a rule is predefined that uniquely determines one of multiple PUCCH resources specified via RRC signaling based on the index of the first (the lowest) one of elements constructing the E-PDCCH used for transmission of the downlink grant. For example, as illustrated in FIG. 22, a prescribed number of indices (four indices from index 0 to 3 here) corresponding to the results of performing remainder calculation on the index $n^{1st}_{VRB}$ of the first (or lowest) VRB constructing the E-PDCCH are predefined, and HARQ response information is reported using a PUCCH resource having as index $n_{PUCCH}$ a value of $n^1_{PUCCH,RRC}$ (one of A, B, C, and D here) corresponding to the index (index 0 to 3) determined from the E-PDCCH detected at step S2103.

While the above description showed a case where the PUCCH resource to be used is selected from multiple pre-configured PUCCH resources in accordance with the result of remainder calculation on the index of an element constituting the E-PDCCH, this is not limitative; the result of other kinds of calculation on the index of an element may be employed. Alternatively, a bit sequence generated by masking (adding certain bits to) CRC bits included in the E-PDCCH may be detected and the PUCCH resource to be used may be selected from pre-configured multiple PUCCH resources in accordance with the detected bit sequence. In this manner, a PUCCH resource can be implicitly/tacitly selected from the detected E-PDCCH.

Finally, the terminal 102 uses the PUCCH resource selected at step S2104 to report HARQ response information.

While the number of PUCCH resources that are configured at step 2102 and the number of PUCCH resources that can be implicitly/tacitly specified at step 2103 were both described as four, they may be other numbers of course.

As described, the base station 101 explicitly specifies (configures, indicates) beforehand to the terminal 102 multiple uplink control channel resources that can be used for reporting HARQ response information corresponding to downlink transmit data. When transmitting downlink transmit data in relation to a downlink grant in an E-PDCCH region, the base station 101 explicitly specifies in a downlink grant an uplink control channel resource to be used for reporting HARQ response information corresponding to the downlink transmit data. Here, the base station 101 specifies the resource from among multiple uplink control channel resources that were specified (configured, indicated) in advance. The base station 101 then monitors the uplink control channel resource it specified to extract HARQ response information.

If the terminal 102 has detected a downlink grant in an E-PDCCH region, the terminal 102 reports HARQ response information for downlink transmit data associated with the downlink grant using the PUCCH resource explicitly specified in the downlink grant among uplink control channel resources that were explicitly specified (configured, indicated) in advance.

This allows an uplink control channel to be allocated to the terminal even when a downlink grant is transmitted and received using an E-PDCCH. Also, in transmission of a downlink grant using an E-PDCCH, the uplink control channel to be used is dynamically specified. Consequently, uplink control channels can be utilized efficiently.

The base station 101 explicitly specifies (configures, indicates) beforehand to the terminal 102 multiple uplink control channel resources that can be used for reporting HARQ response information corresponding to downlink transmit data. When transmitting downlink transmit data in relation to a downlink grant in an E-PDCCH region, the base station 101 implicitly/tacitly specifies in a downlink grant an uplink control channel resource to be used for reporting HARQ response information corresponding to the downlink transmit data. Here, the base station 101 specifies the resource from among multiple uplink control channel resources that were specified (configured, indicated) in advance. The base station 101 then monitors the uplink control channel resource it specified to extract HARQ response information.

If the terminal 102 has detected a downlink grant in an E-PDCCH region, it reports HARQ response information for downlink transmit data associated with the downlink grant using a PUCCH resource implicitly/tacitly specified in the downlink grant among multiple uplink control channel resources that were explicitly specified (configured, indicated) in advance.

This allows an uplink control channel to be allocated to the terminal even when a downlink grant is transmitted and received using an E-PDCCH. Also, in transmission of a downlink grant using an E-PDCCH, the uplink control channel to be used is dynamically specified. Consequently, uplink control channels can be utilized efficiently.

While this embodiment was described for a case where a downlink grant is transmitted and received using an E-PDCCH, a downlink grant may also be transmitted/received switching between a PDCCH and an E-PDCCH as in the first embodiment. For example, the base station 101 may explicitly specify (configure, indicate) beforehand to the terminal 102 multiple uplink control channel resources that can be used for reporting HARQ response information corresponding to downlink transmit data, and when sending downlink transmit data in relation to a downlink grant in an E-PDCCH region, specify in the downlink grant an uplink control channel resource to be used for reporting HARQ response information corresponding to the downlink transmit data. When transmitting downlink transmit data in relation to a downlink grant in a PDCCH region, the base station 101 assigns the downlink grant to a PDCCH resource that corresponds to the uplink control channel resource that will be used for reporting HARQ response information corresponding to the downlink transmit data. If the terminal 102 has detected a downlink grant in a PDCCH region, it reports HARQ response information for downlink transmit data associated with the downlink grant using a PUCCH resource that is uniquely determined from the PDCCH resource used for transmission of the downlink grant. If the terminal 102 has detected a downlink grant in an E-PDCCH region, it reports HARQ response information for downlink transmit data associated with the downlink grant using the PUCCH resource that is specified in the downlink grant among multiple uplink control channel resources that were explicitly specified (configured, indicated) in advance.

While the above described embodiments use resource elements and resource blocks as the units of mapping data channels, control channels, PDSCH, PDCCH, and reference signals, and use subframe and radio frame as the units of transmission in temporal direction, they are not limitative. Similar effects can be achieved using region and time units represented by certain frequency and time instead.

While an enhanced physical downlink control channel 103 placed in a PDSCH region is referred to as E-PDCCH so that it is clearly distinguished from the conventional physical downlink control channel (PDCCH) in the above described embodiments, this is not limitative. Even where the two types of channel are both called PDCCH, implementing different operations in an enhanced physical downlink control channel placed in a PDSCH region and the conventional physical downlink control channel placed in a PDCCH region is substantially equivalent to the embodiments in which E-PDCCH and PDCCH are distinguished.

While the above described embodiments showed a case where always a single downlink grant is received, this is not limitative. For example, even in a scenario where multiple downlink grants can be received, such as when downlink grants for multiple cells are received at a time, the processes described in the embodiments may be performed for reception of a single downlink grant to attain similar effects.

Programs according to the present invention to run in a base station and a terminal are programs that control a CPU and the like (programs that cause a computer to function) so that the functionality of the embodiments of the invention described above is realized. Information handled in these devices is temporarily saved in random access memory (RAM) during its processing, and then stored in any of various kinds of read-only memory (ROM) and/or a hard disc drive (HDD), from which it is read or modified or written by a CPU as necessary. Recording media for storing the programs may be any of semiconductor media (e.g., ROM, non-volatile memory card), optical recording media (e.g., digital versatile disc (DVD), magneto-optical disc (MO), mini-disc (MD), compact disc (CD), or blu-ray disc (BD)), magnetic recording media (e.g., magnetic tape, flexible disc), and the like. Also, in addition to realizing the functionality of the above described embodiments by execution of a loaded program, the functionality of the present invention can also be realized through cooperative processing with an operating system or other application programs in accordance with instructions from such a program.

For distribution in a market, the programs may be stored and distributed on portable recording media or transferred to a server computer connected via a network such as the Internet. In this case, a storage device of the server computer is also included in the present invention. Also, part or all of the base station and terminal described in the embodiments may be realized by large scale integration (LSI), which is typically an integrated circuit. The functional blocks of the base station and the terminal may be either individually implemented in chips or some or all of them may be integrated into a chip. An integrated circuit may be realized as a special purpose circuit or a general-purpose processor instead of LSI. If an integrated circuitry technology that replaces LSI emerges with progress in semiconductor technology, integrated circuitry based on such a technology could be employed.

While the embodiments of the present invention have been described with reference to the drawings, specific configurations are not limited to the embodiments and design changes within the scope of the invention are also encompassed. Various modifications may be made to the present invention within the scope defined by the claims, and an embodiment practiced by combining appropriate technical means disclosed in different embodiments also falls within the technical scope of the invention. An arrangement in which elements described in the embodiments and having similar effects are interchanged is also encompassed.

INDUSTRIAL APPLICABILITY

The present invention is advantageous for application to a wireless base station device, wireless terminal device, wireless communications system, and/or a wireless communication method.

REFERENCE SIGNS LIST 101 base station
102 terminal
103 enhanced physical downlink control channel
104 downlink transmit data
105 physical uplink control channel
401 codeword generating unit
402 downlink subframe generating unit
403 physical downlink control channel generating unit
404 OFDM signal transmitting unit
405, 511 transmit antenna
406, 501 receive antenna
407 SC-FDMA signal receiving unit
408 uplink subframe processing unit
409 physical uplink control channel extracting unit
410, 506 higher layer
502 OFDM signal receiving unit
503 downlink subframe processing unit
504 physical downlink control channel extracting unit
505 codeword extracting unit
507 response information generating unit
508 uplink subframe generating unit
509 physical uplink control channel generating unit
510 SC-FDMA signal transmitting unit
2301 base station
2302 terminal
2303 physical downlink control channel
2304 downlink transmit data
2305 physical uplink control channel

The invention claimed is:

1. A terminal apparatus that communicates with a base station apparatus, comprising:
    downlink control channel detection circuitry;
    response information transmission circuitry; and
    memory associated with the downlink control channel detection circuitry and the response information transmission circuitry; wherein
    the downlink control channel detection circuitry monitors a Physical Downlink Control CHannel (PDCCH) and an Enhanced Physical Downlink Control CHannel (EP-DCCH);
    the response information transmission circuitry transmits Hybrid Automatic Repeat request (HARQ) response information;

downlink control information which is transmitted in the PDCCH comprises at least a field for downlink resource block assignment;

downlink control information which is transmitted in the EPDCCH comprises, in addition to the field for downlink resource block assignment, at least a field for specifying a Physical Uplink Control CHannel (PUCCH) resource that is for transmitting the HARQ response information; and the response information transmission circuitry transmits, for a Physical Downlink Shared CHannel (PDSCH) related to the PDCCH, the HARQ response information, using a plurality of PUCCH resources, one of the plurality of PUCCH resources being determined on the basis of a sum of an index of an element which is one of a plurality of elements that construct the PDCCH and a value which is common in a cell, and another one of the plurality of PUCCH resources being determined on the basis of a sum of the index, the value, and one.

2. The terminal apparatus according to claim 1, wherein the circuitry transmits, for a Physical Downlink Shared CHannel (PDSCH) related to the EPDCCH, the HARQ response information, using the PUCCH resource specified.

3. The terminal apparatus according to claim 1, wherein the downlink resource block assignment is a resource block assignment of Physical Downlink Shared Channel (PDSCH), and the HARQ response information is for the PDSCH.

4. A base station apparatus that communicates with a terminal apparatus, comprising:

physical control information notifying circuitry;

response information reception circuitry; and memory associated with the physical control information notifying circuitry and the response information reception circuitry; wherein the physical control information notifying circuitry transmits a Physical Downlink Control CHannel (PDCCH) and an Enhanced Physical Downlink Control CHannel (EPDCCH);

the response information reception circuitry receives Hybrid Automatic Repeat request (HARQ) response information;

downlink control information which is transmitted in the PDCCH comprises at least a field for downlink resource block assignment;

downlink control information which is transmitted in the EPDCCH comprises, in addition to the field for downlink resource block assignment, at least a field for specifying a Physical Uplink Control CHannel (PUCCH) resource that is for transmitting the HARQ response information; and the response information reception circuitry receives, for a Physical Downlink Shared CHannel (PDSCH) related to the PDCCH, the HARQ response information using a plurality of PUCCH resources, one of the plurality of PUCCH resources being determined on the basis of a sum of an index of an element which is one of a plurality of elements that construct the PDCCH and a value which is common in a cell, and another one of the plurality of PUCCH resources being determined on the basis of a sum of the index, the value, and one.

5. The base station apparatus according to claim 4, wherein the response information reception circuitry receives, for a Physical Downlink Shared CHannel (PDSCH) related to the EPDCCH, the HARQ response information, using the PUCCH resource specified.

6. The base station apparatus according to claim 4, wherein the downlink resource block assignment is a resource block assignment of Physical Downlink Shared CHannel (PDSCH), and the HARQ response information is for the PDSCH.

7. A communication method used by a terminal apparatus that communicates with a base station apparatus, the communication method comprising:

monitoring a Physical Downlink Control CHannel (PDCCH) and an Enhanced Physical Downlink Control CHannel (EPDCCH); and transmitting Hybrid Automatic Repeat request (HARQ) response information; wherein, downlink control information which is transmitted in the PDCCH comprises at least a field for downlink resource block assignment;

downlink control information which is transmitted in the EPDCCH comprises, in addition to the field for downlink resource block assignment, at least a field for specifying a Physical Uplink Control CHannel (PUCCH) resource that is for transmitting Hybrid Automatic Repeat reQuest (HARQ) response information; and the transmitting further comprises transmitting, for a Physical Downlink Shared CHannel (PDSCH) related to the PDCCH, the HARQ response information using a plurality of PUCCH resources, one of the plurality of PUCCH resources being determined on the basis of a sum of an index of an element which is one of a plurality of elements that construct the PDCCH and a value which is common in a cell, and another one of the plurality of PUCCH resources being determined on the basis of a sum of the index, the value, and one.

8. A communication method used by a base station apparatus that communicates with a terminal apparatus, the communication method comprising:

transmitting a Physical Downlink Control CHannel (PDCCH);

transmitting an Enhanced Physical Downlink Control CHannel (EPDCCH); and receiving Hybrid Automatic Repeat request (HARQ) response information; wherein downlink control information which is transmitted in the PDCCH comprises at least a field for downlink resource block assignment;

downlink control information which is transmitted in the EPDCCH comprises, in addition to the field for downlink resource block assignment, at least a field for specifying a Physical Uplink Control CHannel (PUCCH) resource that is for transmitting Hybrid Automatic Repeat reQuest (HARQ) response information; and the receiving further comprises receiving, for a Physical Downlink Shared CHannel (PDSCH) related to the PDCCH, the HARQ response information using a plurality of PUCCH resources, one of the plurality of PUCCH resources being determined on the basis of a sum of an index of an element which is one of a plurality of elements that construct the PDCCH and a value which is common in a cell, and another one of the plurality of PUCCH resources being determined on the basis of a sum of the index, the value, and one.

* * * * *